US007000014B2

(12) United States Patent
Poisson et al.

(10) Patent No.: US 07,000,014 B2
(45) Date of Patent: Feb. 14, 2006

(54) MONITORING A VIRTUAL PRIVATE NETWORK

(75) Inventors: Matthew W. Poisson, Manchester, NH (US); Melissa L. Desroches, Kingston, NH (US); James M. Milillo, Manchester, NH (US); Ravi Subbarao, Bedford, NH (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/285,550

(22) Filed: Apr. 2, 1999

(65) Prior Publication Data

US 2003/0033401 A1 Feb. 13, 2003

(51) Int. Cl.
*G06F 15/173* (2006.01)

(52) U.S. Cl. .................................. 709/224; 709/223
(58) Field of Classification Search ................. 709/223, 709/224
See application file for complete search history.

(56) References Cited

U.S. PATENT DOCUMENTS

| 5,751,967 A | 5/1998 | Raab et al. |
| 5,802,286 A | 9/1998 | Dere et al. |
| 5,825,891 A * | 10/1998 | Levesque et al. ............. 380/49 |
| 5,862,339 A | 1/1999 | Bonnaure et al. |
| 5,864,604 A | 1/1999 | Moen et al. |
| 5,864,666 A * | 1/1999 | Shrader ....................... 713/201 |
| 5,926,463 A | 7/1999 | Ahearn et al. |
| 5,963,913 A | 10/1999 | Henneuse et al. |
| 5,966,128 A | 10/1999 | Savage et al. .............. 345/356 |
| 5,978,848 A | 11/1999 | Maddalozzo, Jr. et al. |
| 5,987,135 A * | 11/1999 | Johnson et al. ............... 380/25 |
| 5,987,513 A * | 11/1999 | Prithviraj et al. ........... 709/223 |
| 6,041,166 A * | 3/2000 | Hart et al. ............. 395/200.68 |
| 6,041,347 A * | 3/2000 | Harsham et al. ............ 709/220 |
| 6,046,742 A | 4/2000 | Chari ......................... 345/349 |
| 6,061,334 A * | 5/2000 | Berlovitch et al. ......... 370/255 |
| 6,075,776 A * | 6/2000 | Tanimoto et al. ........... 370/254 |
| 6,079,020 A * | 6/2000 | Liu ............................ 713/201 |
| 6,085,238 A * | 7/2000 | Yuasa et al. ................ 709/223 |
| 6,085,243 A * | 7/2000 | Fletcher et al. ............. 709/224 |
| 6,092,113 A * | 7/2000 | Maeshima et al. .......... 709/230 |
| 6,092,200 A | 7/2000 | Muniyappa et al. |
| 6,115,736 A * | 9/2000 | Devarakonda et al. ...... 709/202 |

(Continued)

FOREIGN PATENT DOCUMENTS

EP          0 838 930 A2      4/1998
WO         WO 97/50210       12/1997

OTHER PUBLICATIONS

Configuring and Maintaining Networks with Optivity NET Configurator 2.0 Manual, Bay Networks, Oct. 1998.
New Oak Communications Extranet Access Switch Administrator's Guide Manual, Dec. 1997.
Rooney, Sean, et al., "The Tempest: A Framework for Safe, Resource–Assured Programmable Networks," IEEE Communications Magazine, Oct. 1998, pp. 42–53.
Kositpaiboon, Rungroj, et al., "Customer Network Management for B–ISDN/ATM Services," Communications, 1993. ICC 1993 Geneva, Technical Program, Conference Record, IEEE International Conference.

*Primary Examiner*—Saleh Najjar
(74) *Attorney, Agent, or Firm*—Kevin L. Smith

(57) ABSTRACT

Managing a virtual private network includes receiving information describing at least one virtual private network attribute from multiple computers providing at least one virtual private network function, preparing a report by organizing the received information into a table that lists each of the multiple computers and the corresponding virtual private network attribute received from each of the multiple computers, and displaying the prepared report to a user.

20 Claims, 36 Drawing Sheets

U.S. PATENT DOCUMENTS

| | | | |
|---|---|---|---|
| 6,148,337 A * | 11/2000 | Estberg et al. | 709/224 |
| 6,188,691 B1 * | 2/2001 | Barkai et al. | 370/390 |
| 6,205,488 B1 * | 3/2001 | Casey et al. | 709/238 |
| 6,209,031 B1 | 3/2001 | Casey et al. | |
| 6,219,699 B1 * | 4/2001 | McCloghrie et al. | 709/221 |
| 6,223,218 B1 * | 4/2001 | Iijima et al. | 709/221 |
| 6,226,751 B1 * | 5/2001 | Arrow et al. | 713/201 |
| 6,233,618 B1 | 5/2001 | Shannon | |
| 6,243,815 B1 | 6/2001 | Antur et al. | |
| 6,256,739 B1 | 7/2001 | Skopp et al. | |
| 6,259,448 B1 | 7/2001 | McNally et al. | 345/348 |
| 6,272,537 B1 | 8/2001 | Kekic et al. | 709/223 |
| 6,282,175 B1 * | 8/2001 | Steele et al. | 370/254 |
| 6,286,050 B1 * | 9/2001 | Pullen et al. | 709/229 |
| 6,304,909 B1 | 10/2001 | Mullaly et al. | |
| 6,308,206 B1 * | 10/2001 | Singh | 709/223 |
| 6,308,281 B1 * | 10/2001 | Hall et al. | 714/4 |
| 6,330,562 B1 | 12/2001 | Boden et al. | |
| 6,369,840 B1 | 4/2002 | Barnett et al. | |
| 6,374,293 B1 | 4/2002 | Dev et al. | 709/220 |
| 6,374,296 B1 | 4/2002 | Lim et al. | 709/225 |
| 6,408,336 B1 | 6/2002 | Schneider et al. | |
| 6,442,615 B1 * | 8/2002 | Nordenstam et al. | 709/241 |
| 6,526,442 B1 | 2/2003 | Stupek, Jr. et al. | |

* cited by examiner

Bulk Extranet Switch Configuration

SNMP Traps
SNMP Trap settings of the SNMP model type

Community Name

Host Name

Enable

Interval (hh:mm:ss)

Enable | Description
- Trap on health warnings
- Trap on health alerts
- Generate periodic heartbeat
- Trap on hardware warnings and alerts
- Trap on intrusions
- Trap on failed login attempts
- Generate power up trap Clear    < Back  Next >  OK  Cancel  Revert

*FIG. 10*

| Switch Name | Host Name | Domain Name | Primary Server | Secondary Server | Tertiary Server |
|---|---|---|---|---|---|
| RobertPSmack | RobertPSmack | hi.com | 0.0.0.0 | 0.0.0.0 | 0.0.0.0 |
| NOC2000 | NOC2000 | corpeast.baynetworks.com | 132.245.135.76 | 132.245.135.108 | 0.0.0.0 |
| Extranet Switch | <null> | <null> | <null> | <null> | <null> |

*FIG. 17*

| Switch Name | IPSec Priv/Pub | PPTP Priv/Pub | L2TP & L2F | HTTP | SNMP | FTP | TELNET | User to User | User to Branch | Branch to Branch |
|---|---|---|---|---|---|---|---|---|---|---|
| RobertPSmack | Private | Private | Private | Private | Private | Private | Private | Disabled | Disabled | Disabled |
| NOC2000 | | | | Private | Private | Private | Private | Enabled | Enabled | Enabled |
| Extranet Switch | | | | | | | | Disabled | Disabled | Disabled |

FIG. 18

VPN Confivity Trend Report

VPN Trend Report
Extranet Switch Trend Report

*No Sort*

Dates: 1/1/99 through 3/1/99

| Contivity Switch | Total | Admin Sessions | IPSec Sessions | PPTP Sessions | L2F Sessions | L2TP Sessions |
|---|---|---|---|---|---|---|
| RobertPSmack | 67 | 67 | 0 | 0 | 0 | 0 |
| NOC2000 | 0 | 0 | 0 | 0 | 0 | 0 |
| Extranet Switch | 0 | 0 | 0 | 0 | 0 | 0 |

[Clear]  [OK] [Print] [Save]

*FIG. 20*

MONITORING A VIRTUAL PRIVATE NETWORK

REFERENCE TO RELATED APPLICATIONS

This application relates to the following U.S. patent applications: U.S. Ser. No. 09/285,133, entitled "Bulk Configuring a Virtual Private Network", filed Apr. 2, 1999; U.S. Ser. No. 09/285,558, entitled "Links for Configuring a Virtual Private Network", filed Apr. 2, 1999; and U.S. Ser. No. 09/285,424, entitled "Managing a Virtual Private Network", field Apr. 2, 1999.

BACKGROUND

This invention relates particularly to monitoring a virtual private network.

LANs (Local Area Networks), Intranets, and other private networks interconnect user computers, file servers, e-mail servers, databases, and other resources. Typically, organizations want to offer remote access to private network resources to traveling employees, employees working at home, and branch offices without compromising the security of the private network.

Virtual private networks (a.k.a. Extranets) securely stitch together remote private networks and remote computers using a public network such as the Internet as a communication medium. Each private network can connect to the public network via an extranet switch such as the Contivity™ Extranet switch offered by Nortel™ Networks. Extranet switches provide a variety of virtual private network functions such as network packet tunneling and authentication.

For configuring the functions provided by the switch, Contivity™ switches offer a web-server and web-pages programmed to configure the different virtual private network functions in response to administrator interaction with the web-pages. By using a browser to navigate to each virtual private network switch, one after another, the administrator can configure the tunneling, authentication, packet filtering, and other functions provided by the switch. Management functions provided by the Contivity™ switches are described in greater detail in the New Oak™ Communications Extranet Access Switch Administrator's Guide.

SUMMARY OF THE INVENTION

In general, in one aspect, the invention features a method of managing a virtual private network that includes receiving information describing at least one virtual private network attribute from multiple computers providing at least one virtual private network function, preparing a report by organizing the received information into a table that lists each of the multiple computers and the corresponding virtual private network attribute received from each of the multiple computers, and displaying the prepared report to a user.

Embodiments may include one or more of the following. The method may further include transmitting a request for the information. The virtual private network functions may include providing a tunnel and/or authentication. The attribute may include a tunneling characteristic (e.g., tunnel capacity, number of users actually using a tunnel, the protocol used by a tunnel). The method may further include receiving a time interval, and preparing the report based on the received time interval.

In general, in another aspect, the invention features a method of managing a virtual private network that includes transmitting a request for tunneling data to multiple computers providing virtual private network tunnels, receiving the requested tunneling data from the multiple computers in response to the request, preparing a report based on the received information, the report being organized into a table that lists the different computers and their corresponding tunneling data, and displaying the prepared report to a user.

In general, in another aspect, the invention features a method of monitoring a virtual private network that includes receiving information from multiple computers providing virtual private network tunnels, the information including a number of tunnels provided by each computer and a number of users configured to use the tunnels, and displaying the received information to a user.

In general, in another aspect, the invention features a method of monitoring a virtual private network that includes receiving information from multiple computers providing virtual private network tunnels, the information including usage of tunnel protocols over a period of time, is and displaying the received information to a user.

In general, in another aspect, the invention features a computer program product, disposed on a computer readable medium, for managing a virtual private network. The computer program includes instructions for causing a processor to receive information describing at least one virtual private network attribute from multiple computers providing at least one virtual private network function, prepare a report by organizing the received information into a table that include the at least one virtual private network attribute received from each of the multiple computers, and display the prepared report to a user.

Advantages may include one or more of the following. The reports describing virtual private network configuration and activity eases administration of different computers providing virtual private network functions. The capacity information enables an administrator to determine whether a particular virtual private network computer can handle tunnel requirements for additional users. The trending information also provides an administrator with a valuable snapshot of the current tunneling activity served by a particular computer.

Other advantages of the invention will become apparent in view of the following description, including the figures, and the claims.

BRIEF DESCRIPTION OF THE DRAWINGS

FIGS. 5–13 are screenshots of a wizard that guides an administrator through a bulk configuration process

FIGS. 16–20 are screenshots of extranet switch reports.

DESCRIPTION OF THE PREFERRED EMBODIMENTS

Introduction

An extranet switch manager provides administrators with a tool that centralizes management of different extranet switches in a virtual private network. The manager can bulk configure multiple extranet switches, prepare reports describing the extranet switches, provide convenient access to individual switch configuration mechanisms, and provide an intuitive representation of virtual private network elements. The manager offers these capabilities to an administrator via an easy to use graphical user interface (GUI). After an administrator enters IP (Internet Protocol) addresses of extranet switches in a virtual private network, the switch manager can quickly import and export data to both view the current configuration and activity of the switches and quickly alter the configuration of one or more switches.

Bulk Configuration of Multiple Extranet Switches

Figure 1:
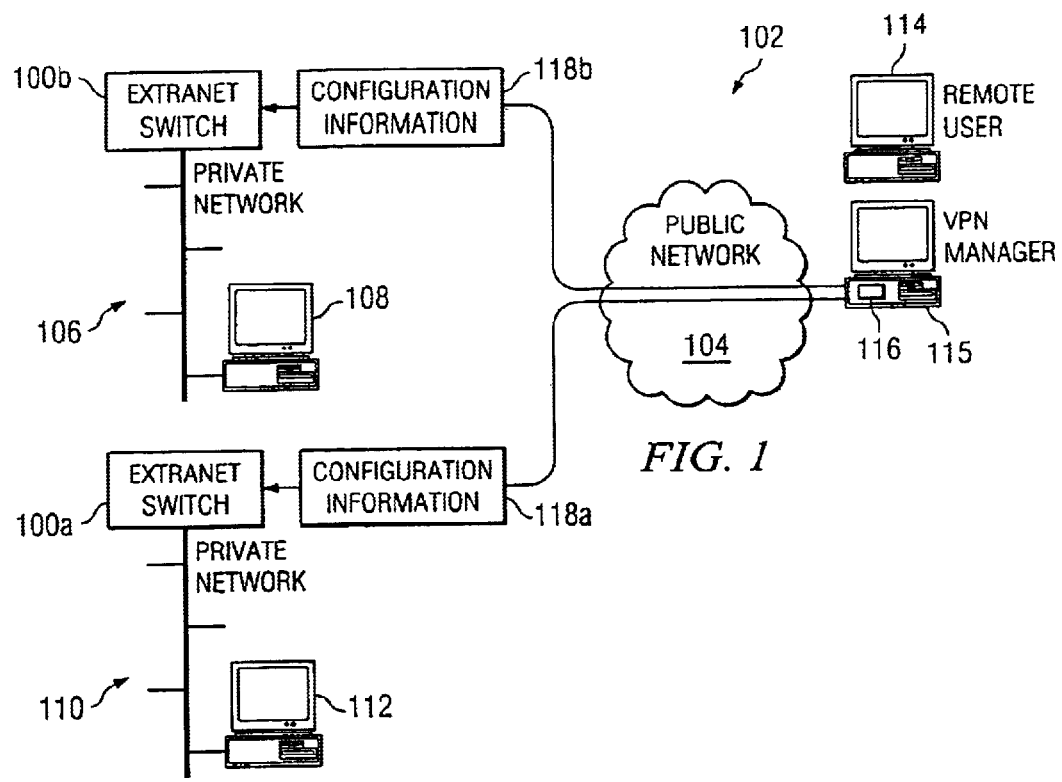
FIG. 1 is a diagram illustrating bulk configuration of multiple extranet switches.

As shown in FIG. 1, a virtual private network 102 can include private networks 106, 110 and/or remote computers 114 that communicate over a public network 104. Each private network 106, 110 can connect to the public network 104 via an extranet switch 100a, 100b such as a Contivity™ Extranet Switch offered by Nortel Networks. As shown, each extranet switch 100a, 100b has a private interface that communicates with a private network 106, 110 and a public interface that communicates with the public network 104. Extranet switches 100a, 100b handle virtual private network functions such as network packet tunneling and authentication. The extranet switches 100a, 100b can also enforce packet filtering rules, enforce hours of access, and perform other functions that maintain a secure virtual private network. Many of these functions may be included in a firewall or router. Hence, we use the term "extranet switch" to generically refer to a system providing these functions. As shown in FIG. 1, switch manager instructions 116 reside on a remote computer, however, the instructions 116 could reside on any computer able to communicate with the extranet switches 100a, 100b.

Each switch 100a, 110b can provide different tunneling protocols (e.g., PPTP (Point-to-Point Tunneling Protocol), L2F (Layer 2 Forwarding), L2TP (Layer 2 Tunnel Protocol), and IPSec (IP Secure)), different encryption schemes, different authentication mechanisms (e.g., internal or external LDAP (Lightweight Directory Access Protocol) and RADIUS (Remote Authentication Dial-In User Service)), and different packet filtering schemes (e.g., filtering based on the direction of communication, the source and/or destination of a packet, and/or the type of TCP (Transfer Control Protocol) connection established). As shown in FIG. 1, switch manager instructions 116 enable an administrator to quickly configure multiple switches 100a, 100b to share a set of common characteristics (e.g., the same authentication scheme and the same tunneling protocols) by transmitting the same configuration information 118a, 118b to each switch 100a, 100b.

Figure 2:
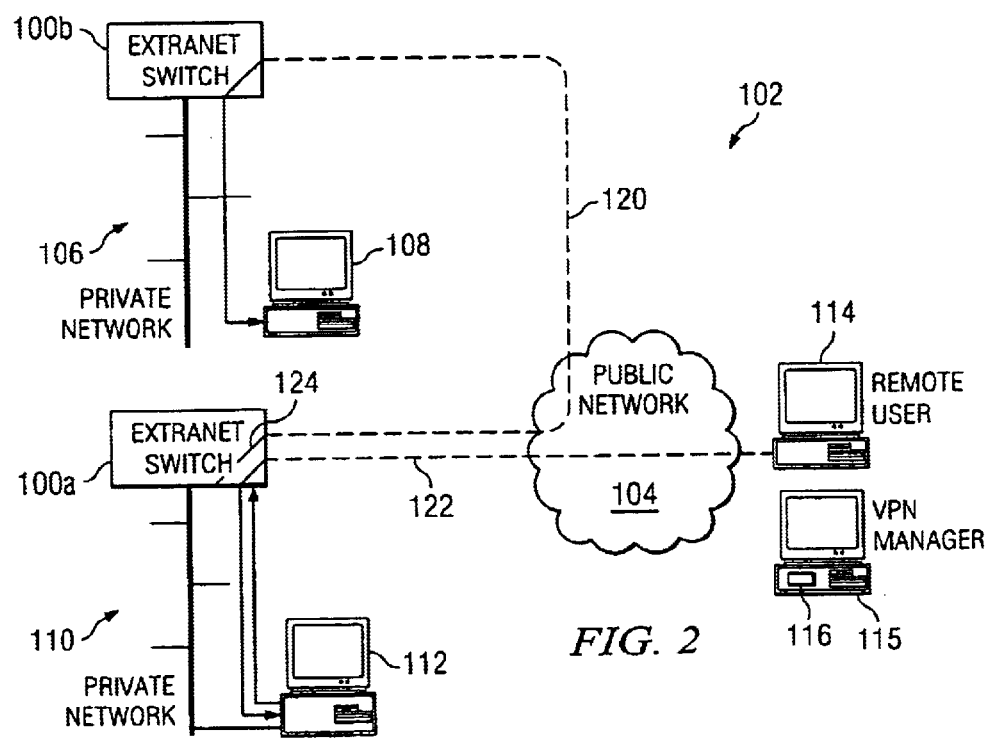
FIG. 2 is a diagram of tunnels provided by configured extranet switches.

Referring to FIG. 2, after being configured, the virtual private network 102 permits secure communication between private networks 106, 110. For example, a computer 112 on a first private network 110 can securely send network packets to a computer 108 on a second private network 106 by tunneling 120 through the public network 104. An extranet switch 100a receiving a packet prior to transmission over the public network 104 can provide a tunnel 120 by encrypting and/or encapsulating the network packet. Encryption encodes packet contents to prevent computers on the public network from reading the original contents. Encapsulation generates a new packet addressed to the extranet switch 100b at the end of the tunnel 120 and includes the original packet as the contents of the new packet. By analogy, encapsulation is like placing a mail envelope in a bigger envelope with a different mail address. Encapsulation prevents computers on the public network 104 from identifying the addresses of private network 106, 110 resources.

When the extranet switch 100b at the end of the tunnel 120 receives a packet, the extranet switch 100b can decrypt and de-encapsulate the packet for delivery to its destination 108. The second extranet switch 100b can also authenticate information received from the first extranet switch 100b to make sure a would-be intruder is not masquerading as a member of the virtual private network 102.

As shown, a switch 100a can also provide tunnels for a remote user 114 connected to the public network 104. For example, an employee can access private network 110 resources by connecting to an ISP (Internet Service Provider) and establishing a tunnel 122 with an extranet switch 100a. Again, the extranet switch 100a can authenticate the identity of the remote user 114 to prevent unauthorized access to the private network 110.

The extranet switch 100a can also connect tunnels. For example, if so configured, the switch could connect 124 tunnels 120 and 122 to enable the remote user 114 to also access resources on private network 106 via tunnels 122 and 120.

Figure 3:
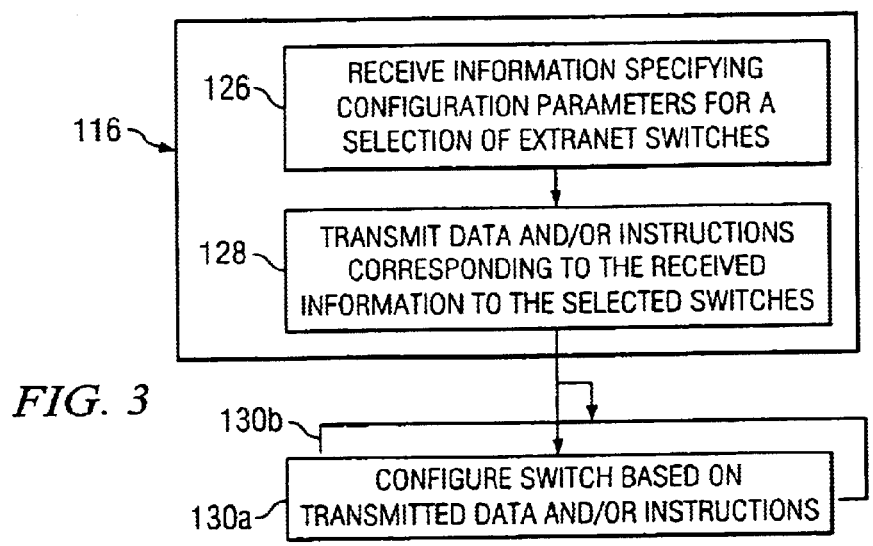
FIG. 3 is a flow-chart of a process for bulk configuring multiple extranet switches.

Referring to FIG. 3, switch manager instructions 116 receive 126 information specifying the configuration of multiple extranet switches. The bulk configuration information can be specified by a user, provided by a program that automatically configures switches, or copied from configuration information of a previously configured switch. After receiving 126 the configuration information, the switch manager instructions 116 transmit 128 data and/or instructions corresponding to the received configuration information to the extranet switches. Each extranet switch processes 130a, 130b the transmitted information to change its configuration in accordance with the transmitted information.

Figure 4:
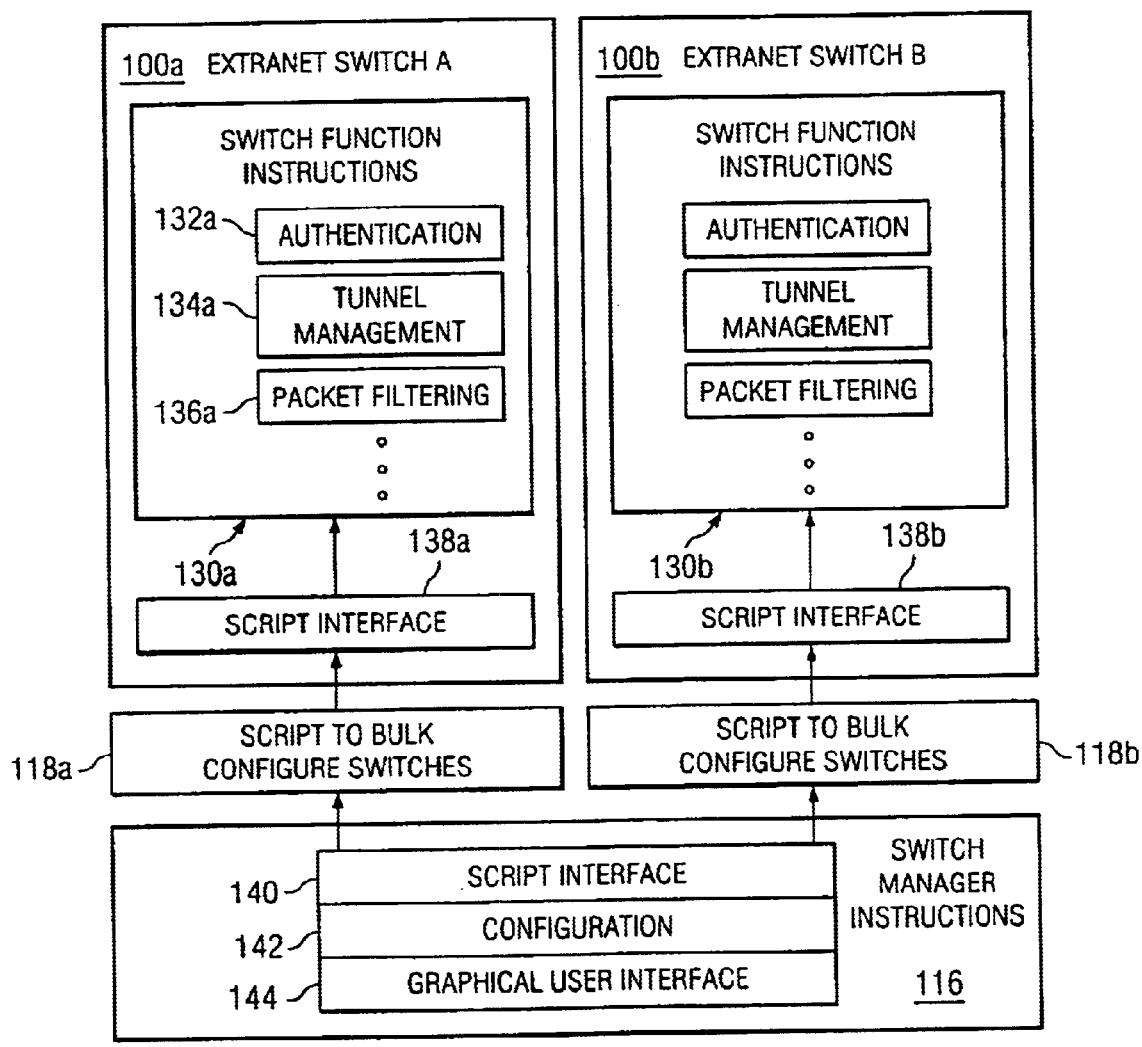
FIG. 4 is a diagram of a switch manager exporting configuration information to multiple extranet switches.

Referring to FIG. 4, an extranet switch 100a, 100b includes software and/or firmware instructions 130a, 130b that handle switch functions. Such functions can include authentication 132a, tunnel management 134a, packet filtering 136a, etc. Each switch 100a, 100b can also include a script interface 138a that processes script commands. For example, a script command of "call omSET sing ("trustedFTPenabled" "ENABLED")" configures the switch to allow processing of FTP (File Transfer Protocol) requests from trusted computers.

In one implementation, switch manager instructions 116 include instructions for a graphical user interface 144 (GUI), a script interface 140, and configuration 142 instructions that model the extranet switches and coordinate the exchange of information between the GUI 144 and the script interface 140. When a user specifies bulk configuration information via the GUI 146, the script interface 142 produces a script 118a, 118b that includes script commands for configuring the switches in accordance with the user specified information. Appendix A includes a sample configuring script. In the implementation described above, the switch manager 116 can export the configuration information 118a, 118b to extranet switches by transmitting the information 118a, 118b to a pre-determined switch directory via FTP (File Transfer Protocol). The script interface 138a, 138b on the switches 100a, 100b detect and process the script upon its arrival.

The exporting technique described above is merely illustrative and a wide variety of other techniques could be used to coordinate communication between a computer executing switch manager instructions 116 and the different extranet switches 100a, 100b. For example, the communication need not use FTP nor need the information take the form of a script.

Figure 5:
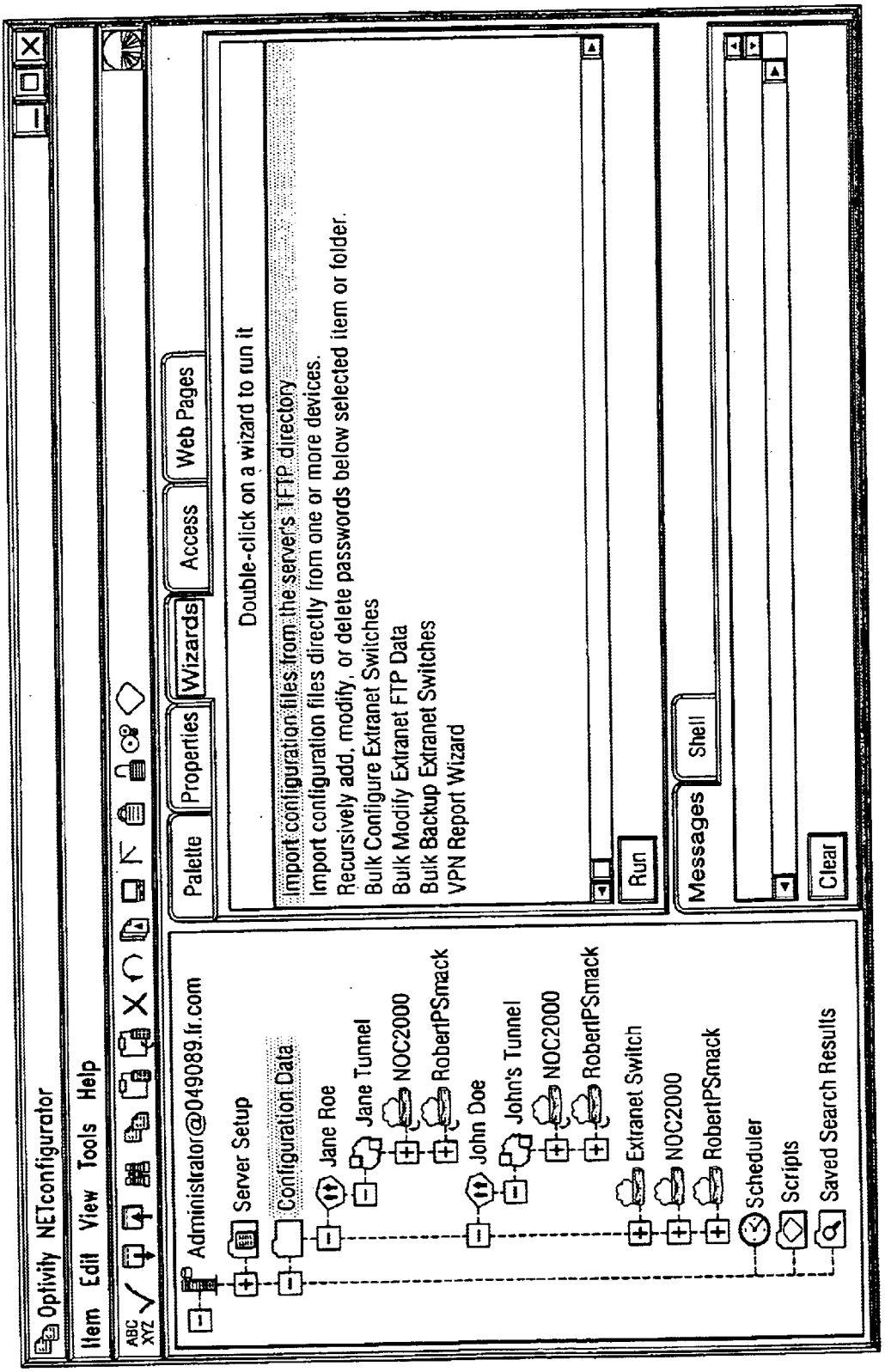

Referring to FIG. 5, the GUI provides a wizard (e.g., Bulk Configure Extranet Switches) that enables an administrator to bulk configure multiple extranet switches by interacting with a preprogrammed series of dialogs. The dialogs query an administrator for different sets of switch characteristics. The preprogrammed set of dialogs reduces the chances an administrator will forget to configure a particular set of switch characteristics.

Figure 6:
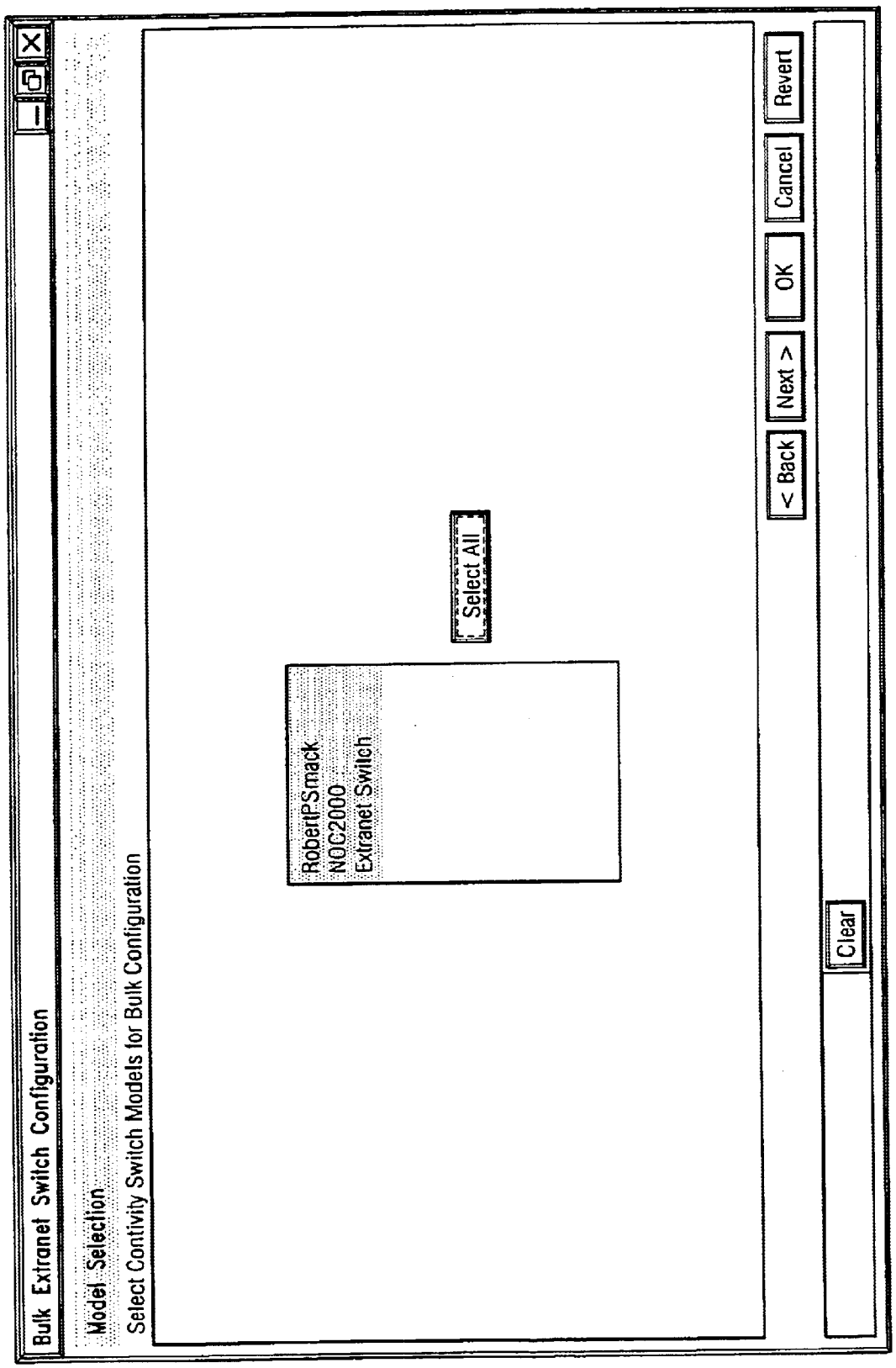

Referring to FIG. 6, after invoking the bulk configuration wizard, an administrator can select one or more extranet switches to bulk configure. The manager will transmit configuration information only to the selected switches.

Figure 7:
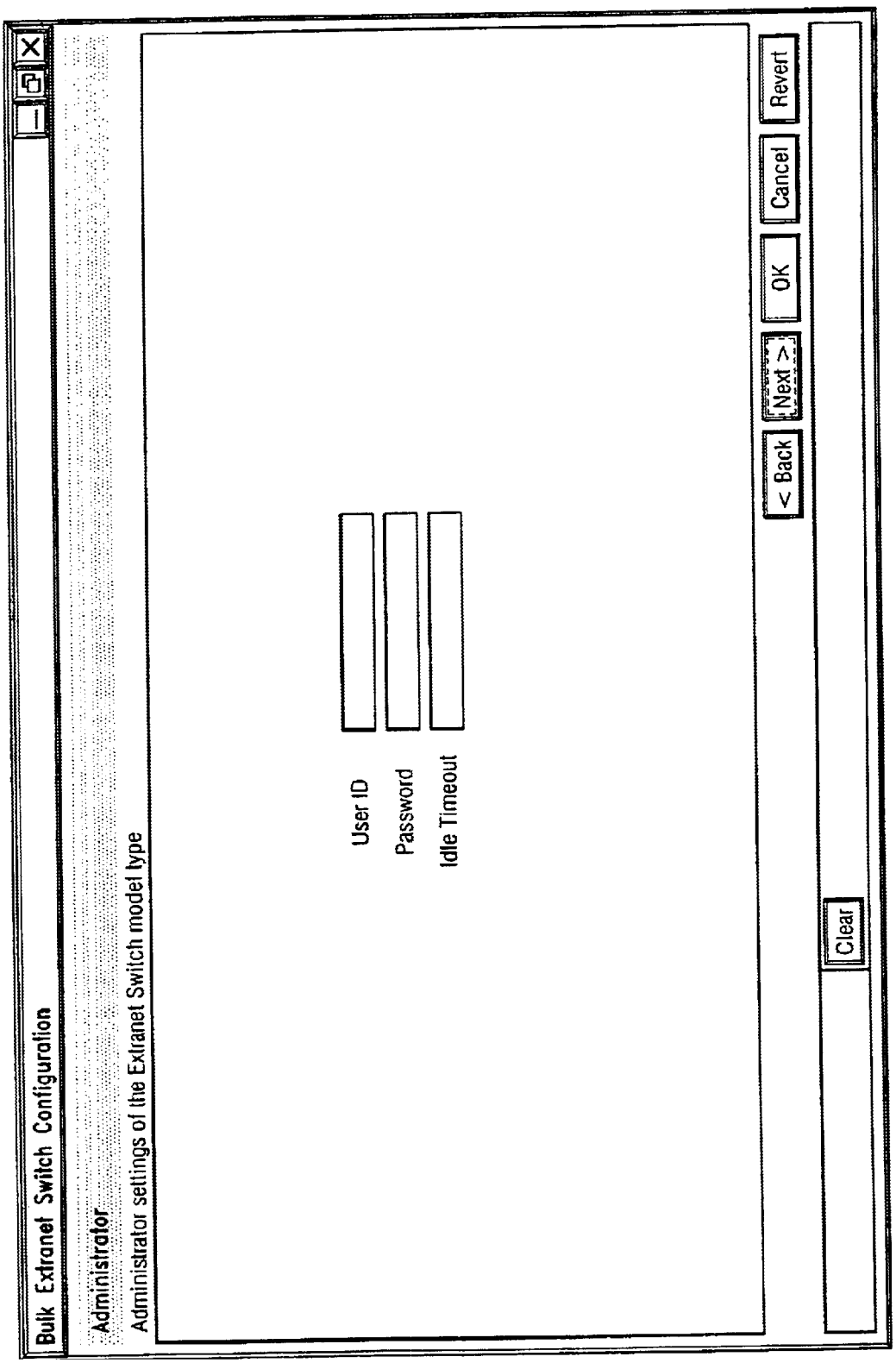

Referring to FIG. 7, the wizard permits an administrator to configure the selected switches to provide an account to a particular administrator. Since a single administrator may be in charge of all the switches in a virtual private network, establishment of an identical administrator account on the different switches enables the administrator to quickly login to the different switches using the same id and password.

Figure 8:
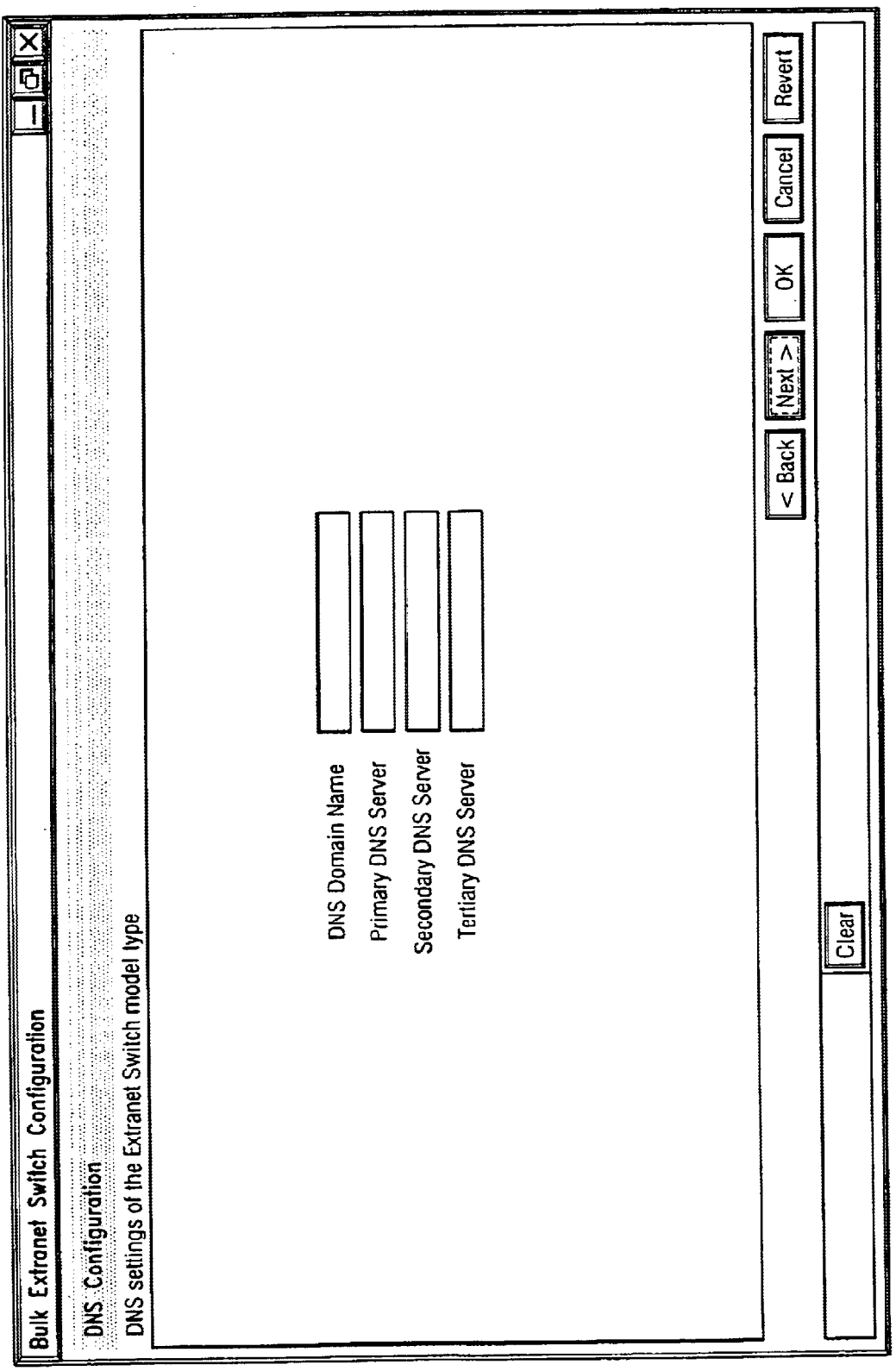

Referring to FIG. 8, each switch may be individually configured to have a unique hostname (e.g., "NOC2000"). An administrator can bulk configure different switches to have the same DNS (domain name service) domain such as "myVPN.com". By defining a common domain for multiple switches, an administrator can thereafter refer to a particular switch by combining the domain name and the hostname (e.g., "myVPN.com/NOC2000"). Primary and backup DNS servers can translate the domain and hostname to a particular IP (Internet Protocol) address. Thus, by specifying a common domain, the administrator can identify a switch by a memorable text entry instead of a more cryptic IP address (e.g., "255.255.68.28").

Figure 9:
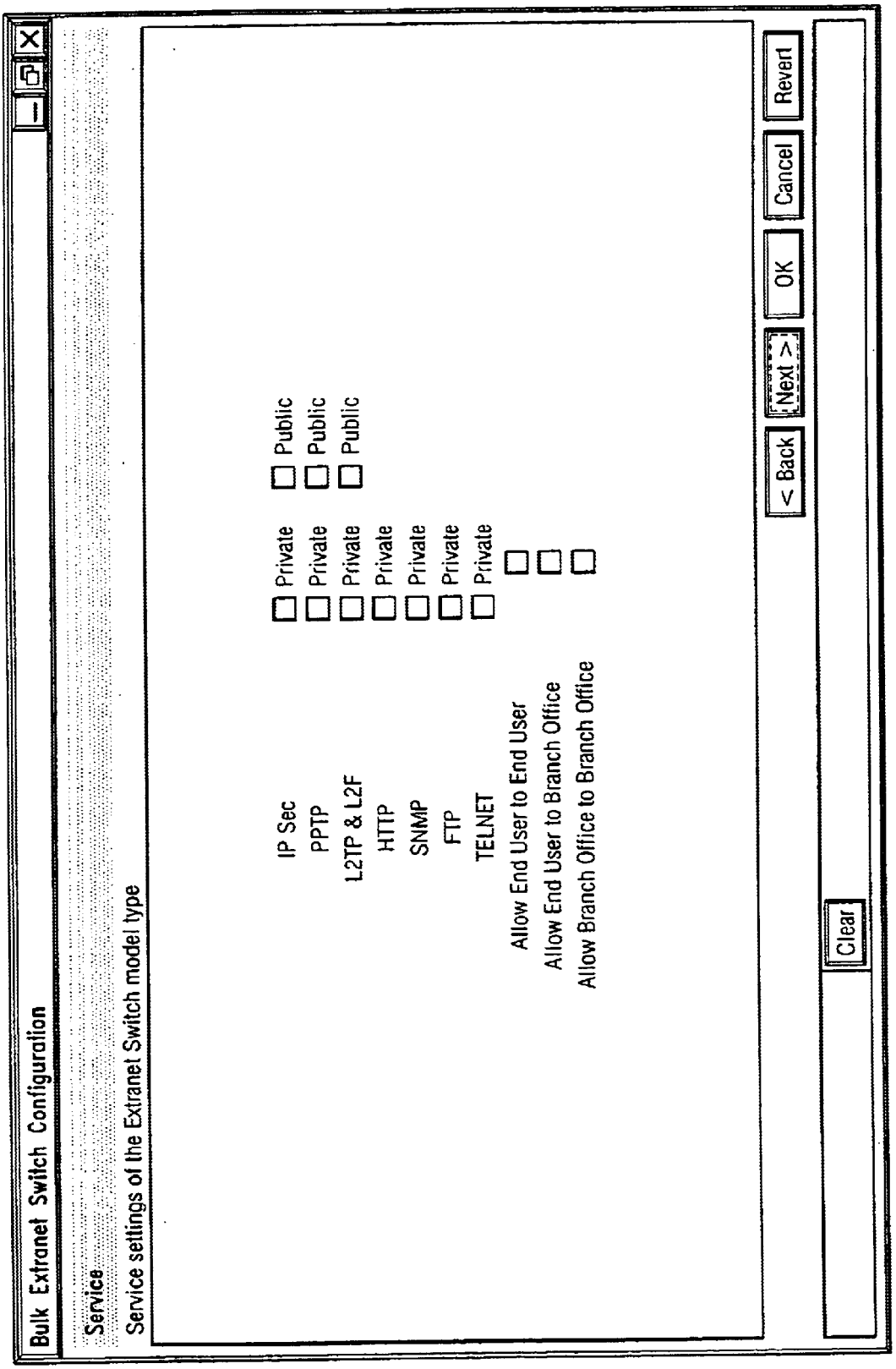

Referring to FIG. 9, an administrator can configure the services offered by the switches. For example, the administrator can enable or disable different tunnel protocols (e.g., IPSec, PPTP, LT2P, and L2F). The GUI also gives the administrator the ability to enable or disable tunneling sessions initiated from within the private network served by a switch and tunneling sessions initiated from a source outside the private network (e.g., "public" tunnels).

The administrator can also enable or disable different communication protocols such as HTTP (HyperText Transfer Protocol), SNMP (Simple Network Management Protocol), FTP (File Transfer Protocol), and TELNET. Additionally, the manager gives the administrator the ability to control the types of communication allowed. For example, an administrator can enable or disable tunnels between two extranet switches (e.g., branch to branch communication), between two users tunneling to the same switch (e.g., end user to end user), and between a user and a branch office tunneling to the same switch.

Referring to FIG. 10, an administrator can bulk configure the SNMP traps reported by the switches and the host computers that will receive notification of the traps. SNMP traps allow an administrator to react to events that need attention or that might lead to problems. The switches allow the scripting of SNMP alerts so that a combination of system variables can signal an SNMP trap. The GUI permits the administrator to not only enable or disable different types of traps, but also to provide the interval between execution of the SNMP scripts.

Figure 11:
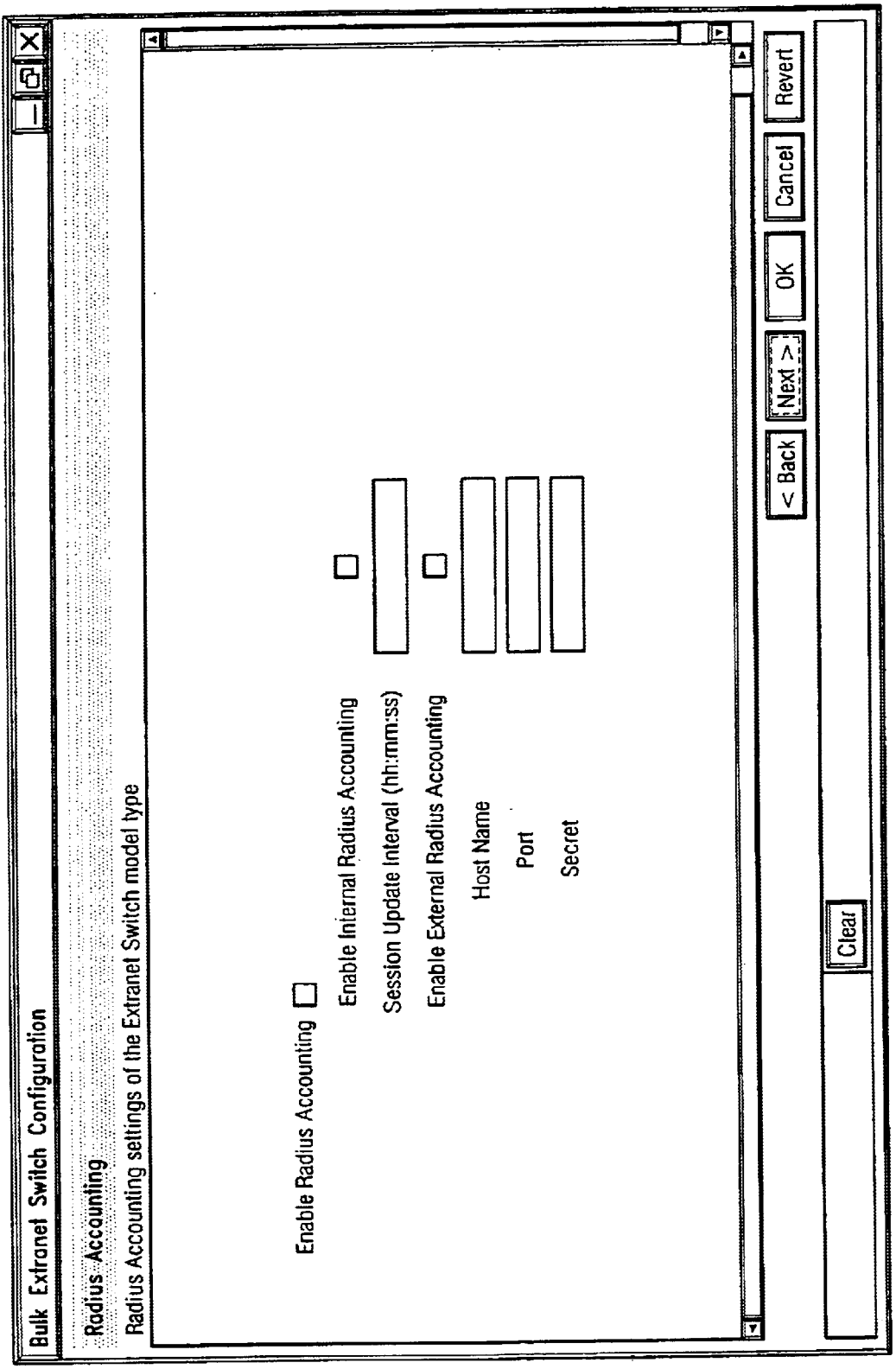

Referring to FIG. 11, an administrator can also configure RADIUS accounting performed by each selected switch. RADIUS is a distributed security system that uses an authentication server to verify dial-up connection attributes and authenticate connections. RADIUS accounting logs sessions with records containing detailed connection statistics. The administrator can enable and disable RADIUS accounting, configure the switches to use internal or external RADIUS servers, and specify how frequently RADIUS records are stored. By configuring the switches in a virtual private network to use the same RADIUS accounting methods, switch usage and access can be easily compared between the different switches.

Figure 12:
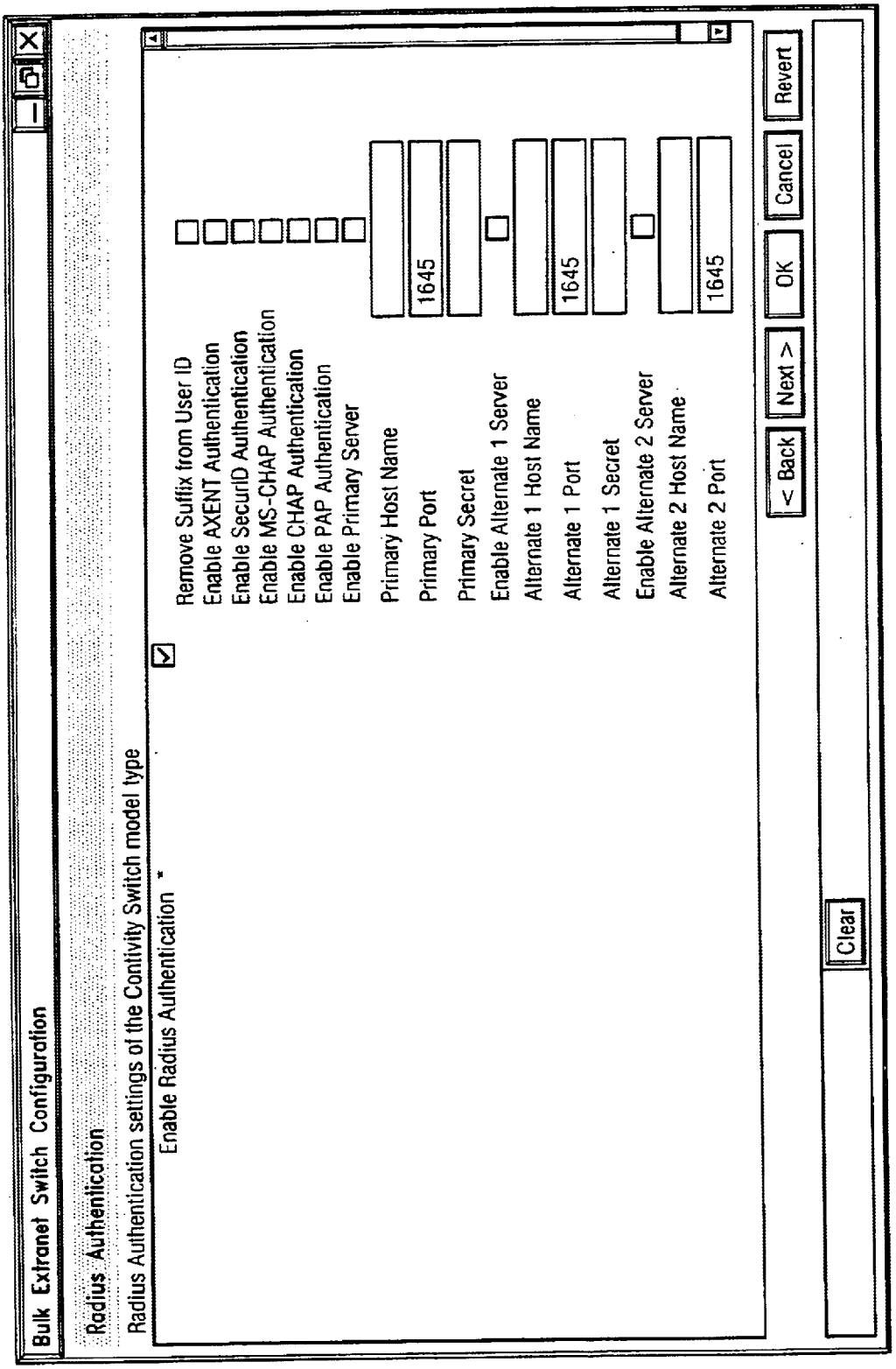

Referring to FIG. 12, if enabled, an administrator can bulk configure the type of RADIUS authentication performed by the switches. For example, as shown, the switches can offer AXENT (AXENT OmniGuard/Defender), SecurID (Security Dynamics SecurID), MS-CHAP (Microsoft Challenge Handshake Authentication Protocol encrypted), CHAP (Challenge Handshake Authentication Protocol), and/or PAP (Password Authentication Protocol) authentication.

The administrator can also define a primary RADIUS server and one or more alternate servers. The primary server receives all RADIUS authentication inquiries unless it is out of service. In the event that the Primary Server is unreachable, the Switch will query the alternate RADIUS servers. By bulk configuring the servers used to provide RADIUS authentication, administrators can quickly route all RADIUS authentication requests to the same collection of RADIUS servers.

Figure 13:
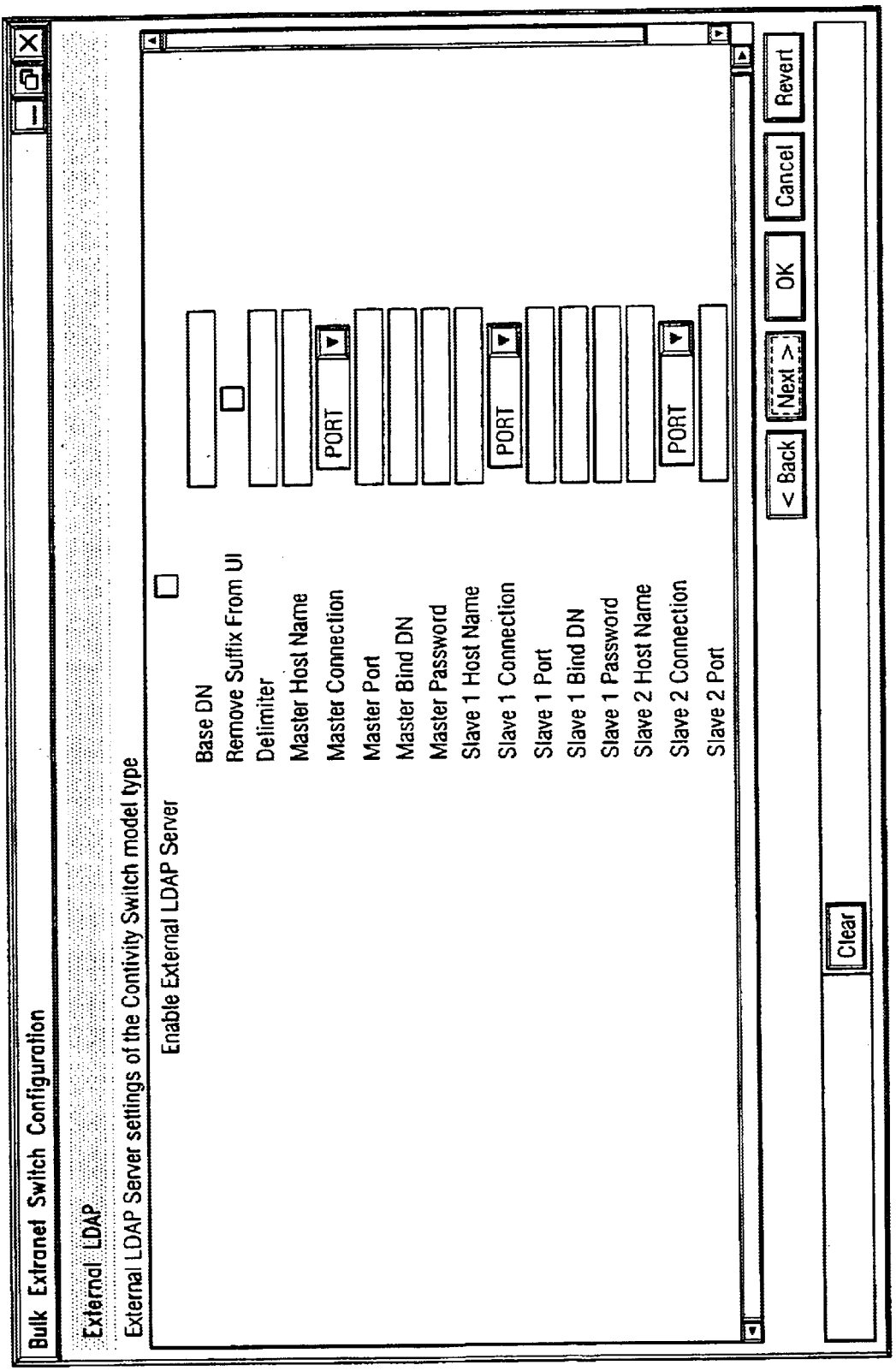

Referring to FIG. 13, switches may use LDAP authentication in addition to or in lieu of RADIUS authentication. An external LDAP Server such as the Netscape Directory Server can store remote access profiles. The switch queries the LDAP Server for access profile information when a user attempts to establish a tunnel connection. The Master LDAP Server is the primary server to process queries. Should the Master server become unavailable, the switch attempts to initiate a connection with the Slave servers. Bulk configuring different switches to use the same LDAP servers both eases the burden of switch management on the administrator and reduces the likelihood the administrator will inadvertently specify a different LDAP hierarchy on different switches.

After completing the bulk configuration wizard, the manager stores the specified configuration information, but does not transmit the information until the administrator specifically exports the configuration data. This provides administrators with a safeguard against accidentally bulk configuring the switches with unintended characteristics.

Reporting Capabilities

Figure 14:
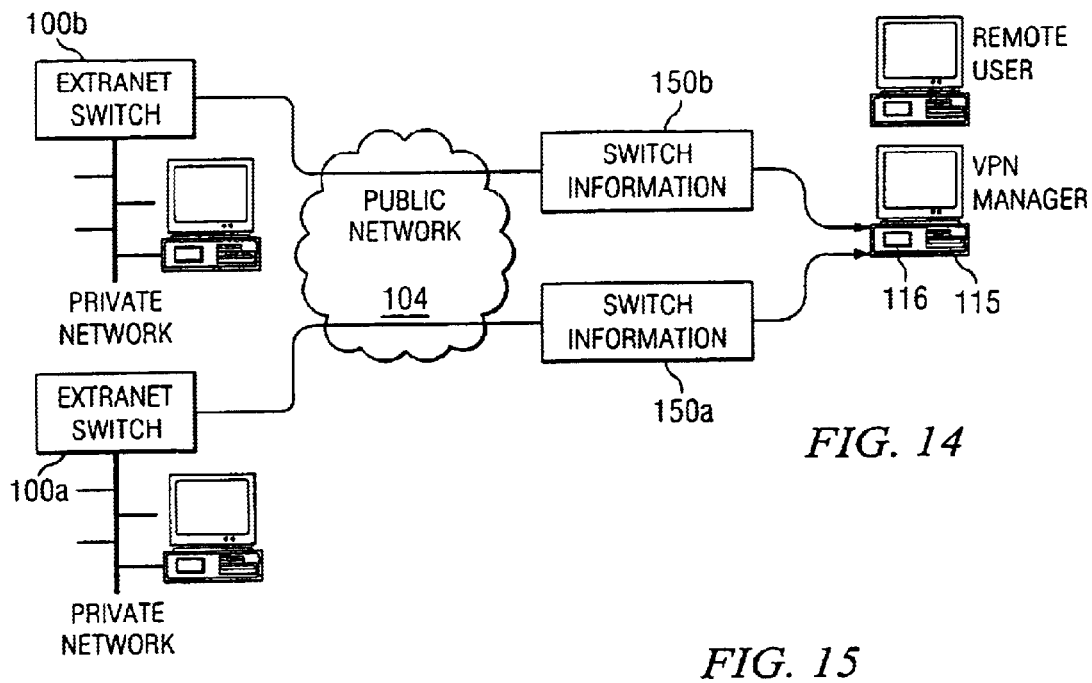
FIG. 14 is a diagram illustrating importing information from multiple extranet switches.

Referring to FIG. 14, in addition to configuring multiple extranet switches 100a, 100b, switch manager instructions 116 can also produce reports describing the extranet switches 100a, 100b in a virtual private network 102. As shown, the extranet switches 100a, 100b can transmit configuration, capacity, and activity information for inclusion in a report.

Figure 15:
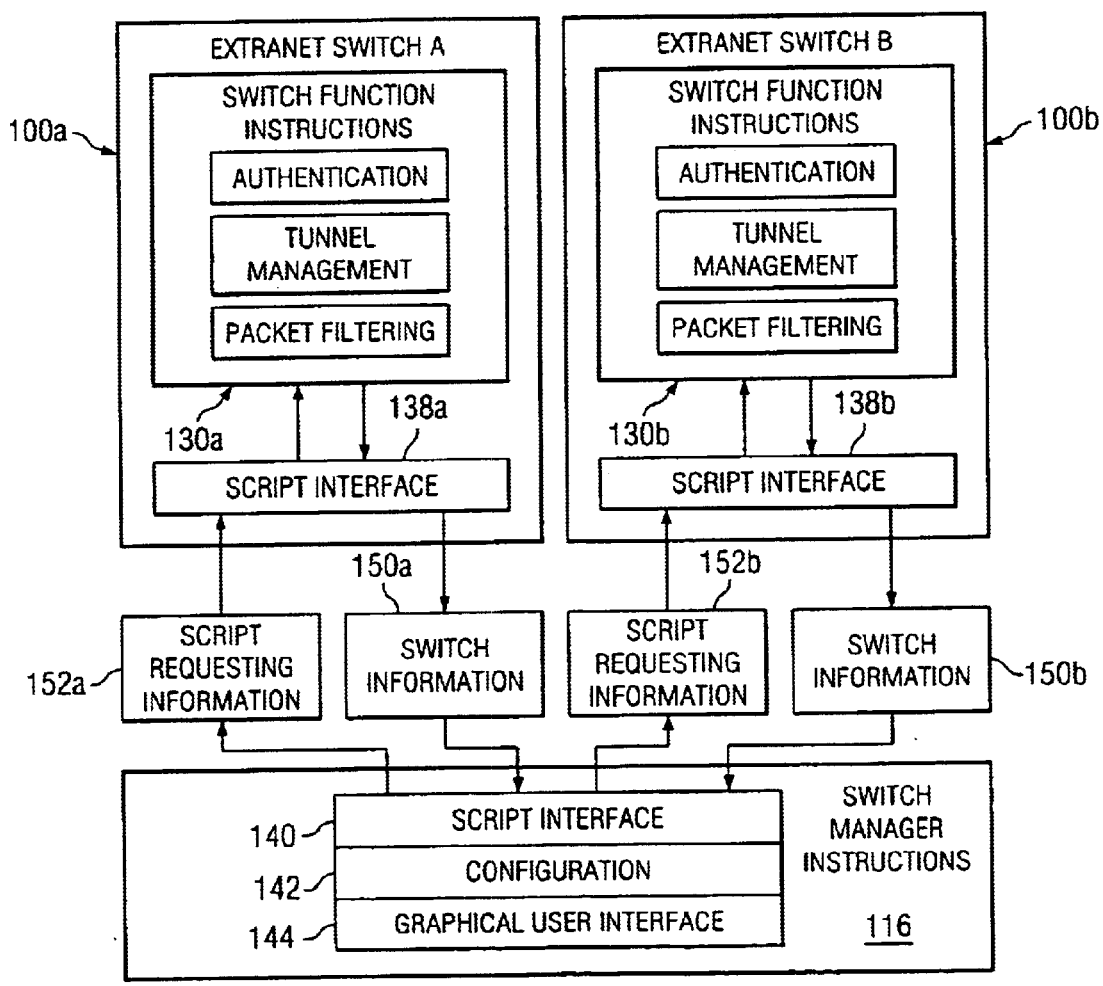
FIG. 15 is a diagram of a switch manager importing information from an extranet switch.

Referring to FIG. 15, switch manager instructions 116 can transmit a script 152a, 152b that includes script commands requesting current switch 100a, 100b information. For example, a script command of "call omGET using ("security.trustedFTPenabled")" requests information describing whether an extranet switch 100a, 100b is currently configured to accept FTP (File Transfer Protocol) requests from a trusted computer. Appendix B includes a sample script requesting information from a Contivity™ switch.

The switch 100a, 100b script interface 138a, 138b processes the script commands 128 and produces a file 150a, is 150b including the requested information. The script interface 138a, 138b on the switch 100a, 100b can store the file in a pre-determined directory. The switch manager instructions 116 can then use FTP to retrieve the information 150a, 150b.

Again, a wide variety of other techniques could enable the switches 100a, 100b to communicate with the switch manager instructions 116. Additionally, instead of the request/response model described above, the switches 100a, 100b could schedule periodic execution of a script and/or periodic transmission of the switch information 150a, 150b.

Figure 16:
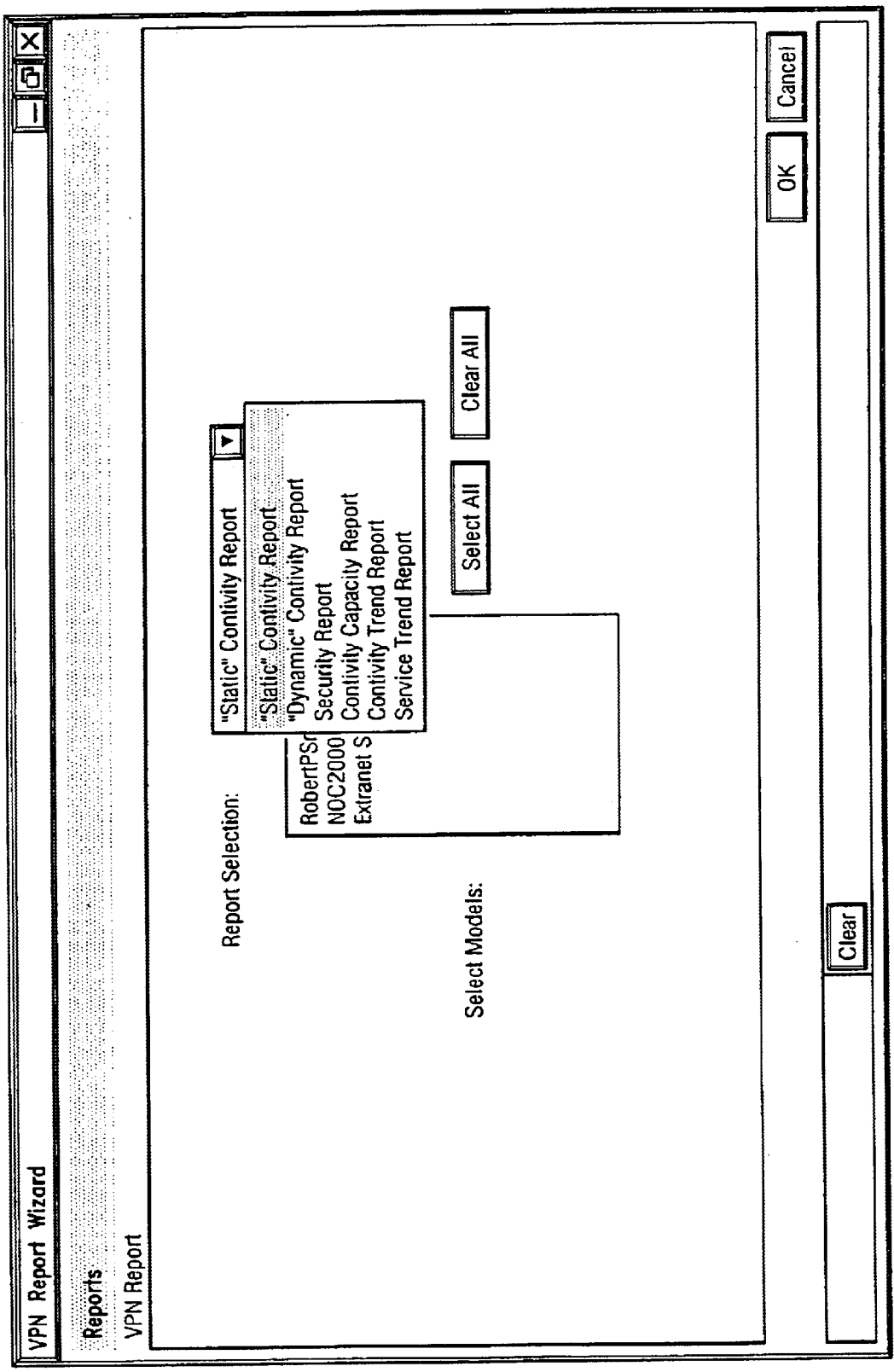

Referring to FIG. 16, the switch manager GUI can provide a menu of different reports that can be produced for selected extranet switches. The manager prepares the report by analyzing and/or including data imported from the different extranet switches.

Referring to FIG. 17, a first report can display different static attributes of the selected switches such as DNS details.

Referring to FIG. 18, a security report displays the security configurations of the selected switches such as the enabling/disabling of different tunneling and communication protocols. The security report can also list changes made to the selected switch configurations when such changes occurred (not shown). The report can also include information summarizing failed access attempts to the switches (not shown). This report enables an administrator to quickly view the different security configurations and any troublesome security statistics.

Figure 19:
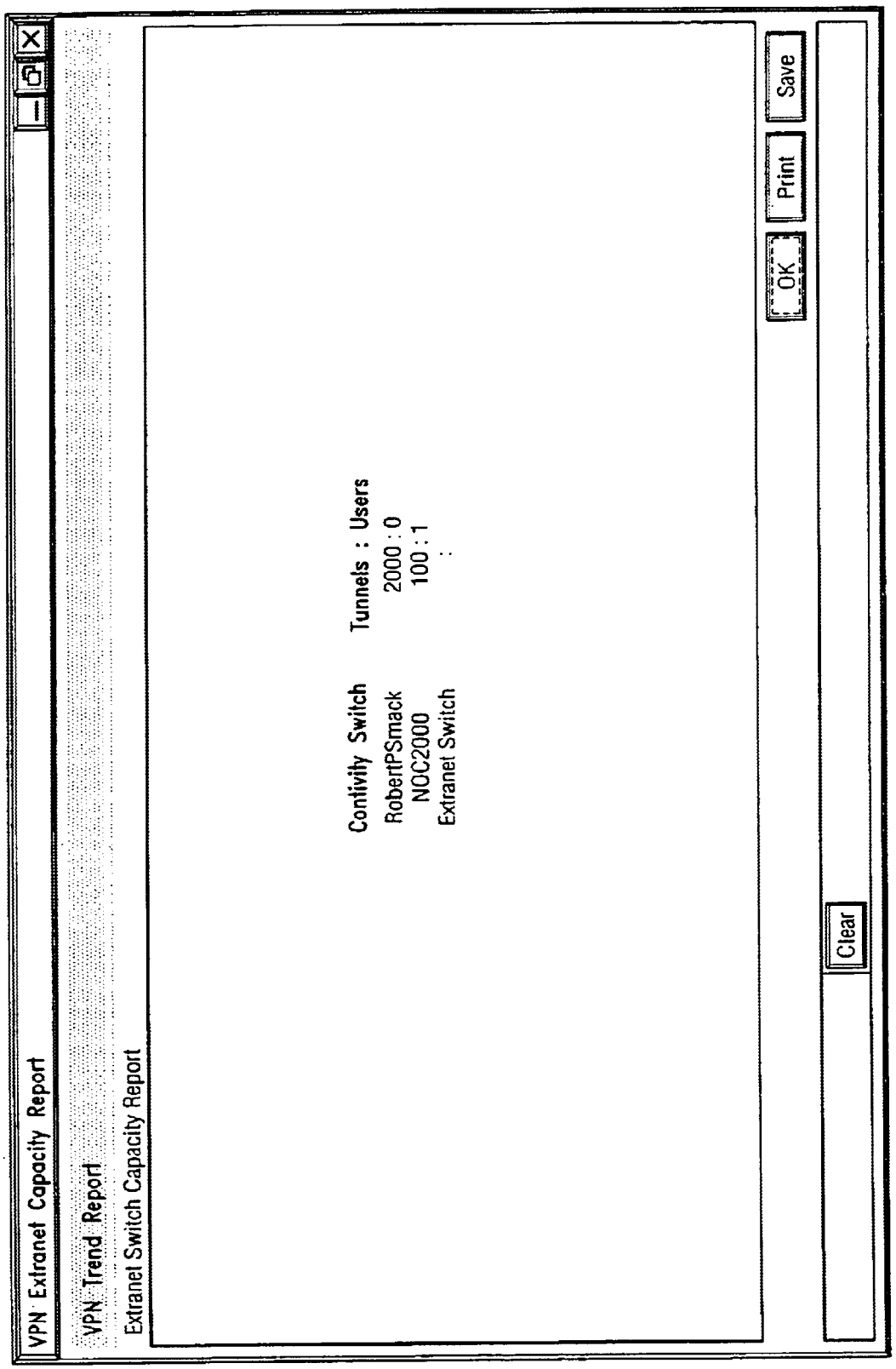

Referring to FIG. 19, a capacity report shows the current total capacity of tunnels that selected switches can provide and the total number of subscribers and/or users configured to use the switch. This report provides a simple but useful gauge of tunnel capacity. Based on the capacity report, an administrator can decide whether to add more subscribers to an available tunnel pool or to increase the size of tunnel pool, for example, by upgrading or adding an extranet switch.

Figure 21:
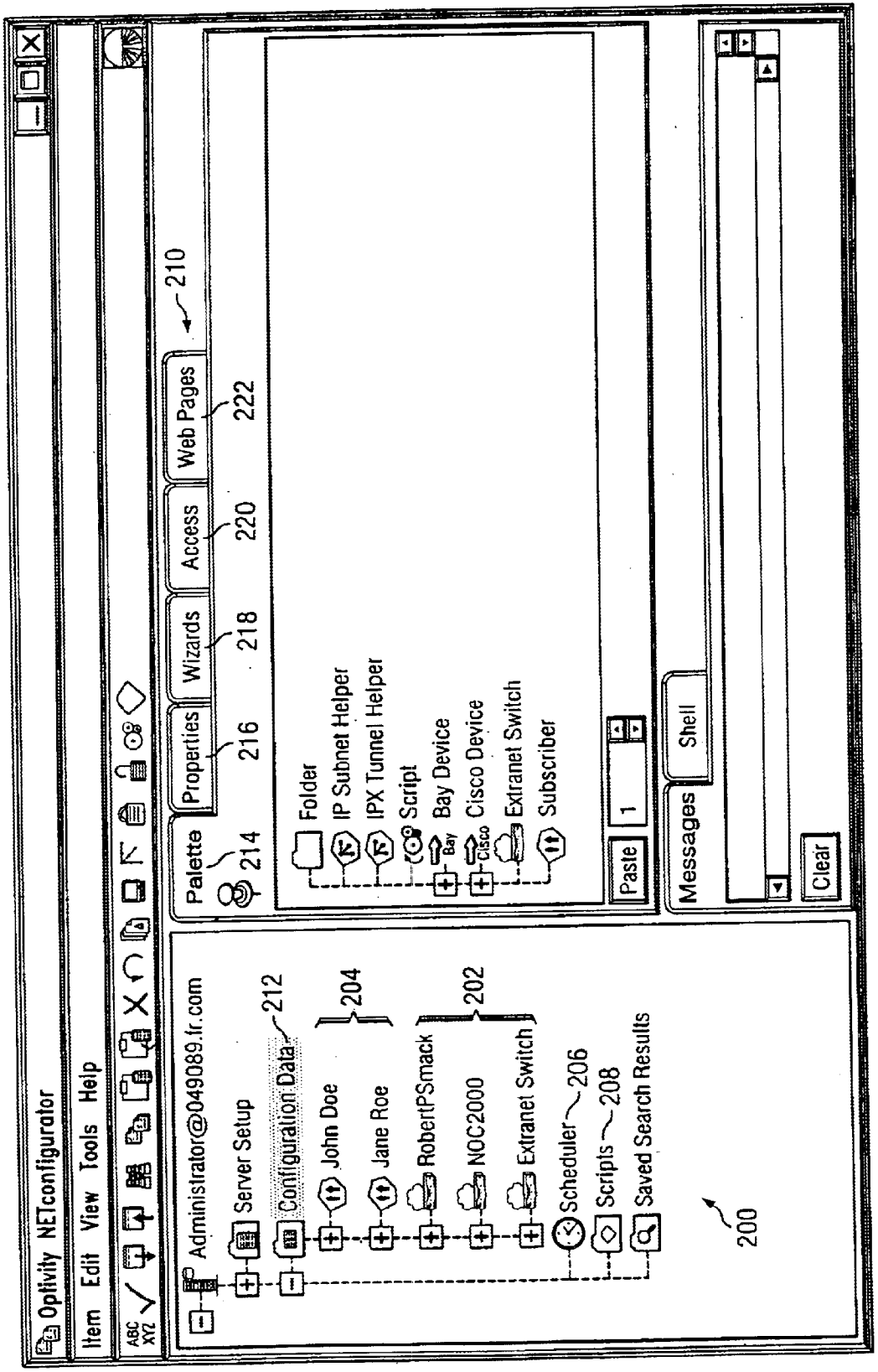
FIGS. 21–31 are screenshots of a graphical user interface that enables an administrator to manage extranet switches in a virtual private network.

Referring to FIG. 20, a trending report displays the number of tunnels for each tunnel technology provided by the different extranet switches over a user-specified amount of time. The report allows subscribers to select any number of currently defined switches or services.
Custom Views Referring to FIG. 21, the switch manager GUI eases administration of a virtual private network extranet switches by collecting information about the entire network in a single display. As shown, the switch manager GUI displays configuration information imported from one or more extranet switches (e.g., via the import mechanism described in conjunction with FIG. 15). The GUI uses a split screen display that includes a navigation pane 200 listing different virtual private network switches 202, subscribers 204, and other information such as periodic scheduling 206 of management functions and scripts 208 that can perform these functions. As shown, the listing uses a hierarchical tree to display the virtual private network elements. An administrator can view a listed element in more detail by expanding the tree (e.g., clicking on the "−" or "+" next to an element). The tree display enables an administrator to quickly find, add, remove, and configure different virtual private network extranet switches.

As shown, the display also provides a tabbed dialog control 210 that provides more information and management options for a virtual private network element currently selected in the navigation pane 200 (e.g., "Configuration Data" 212). The control 210 includes dialogs for adding new elements to the tree from a palette 214 of elements, for viewing and altering properties 216 of a selected element, for a list of wizards 218 that perform tasks frequently used with a selected element, and a list of network links 222 that enable an administrator to manually configure an individual extranet switch. By providing management options corresponding to an element selected in the navigation pane 200, the GUI presents only a relevant subset of a wide variety of different management features at a given moment.

Referring to FIGS. 22–26, the GUI enables an administrator to quickly view and modify the configuration of any particular switch in the virtual private network from within a single application. For example, as shown, an administrator can quickly add a new subscriber 226 to the virtual private network. Briefly, a subscriber is any entity that uses a virtual private network service (e.g., a tunnel protocol). For example, service providers typically use the same extranet switch to provide virtual private network services to different organizations. In this case, each organization could be considered a subscriber. Subscribers can also be individual users.

Figure 22:
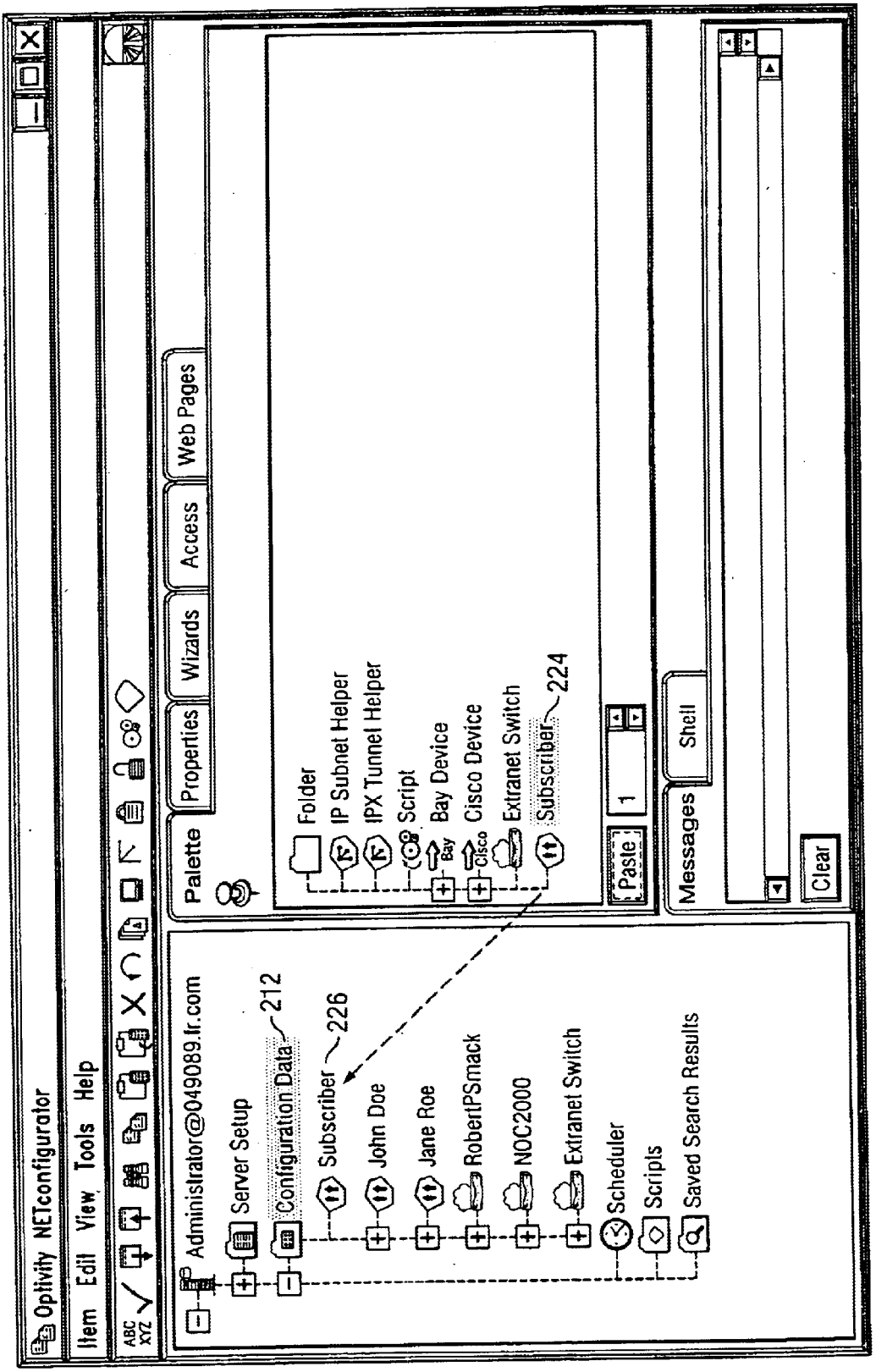
Figure 23:
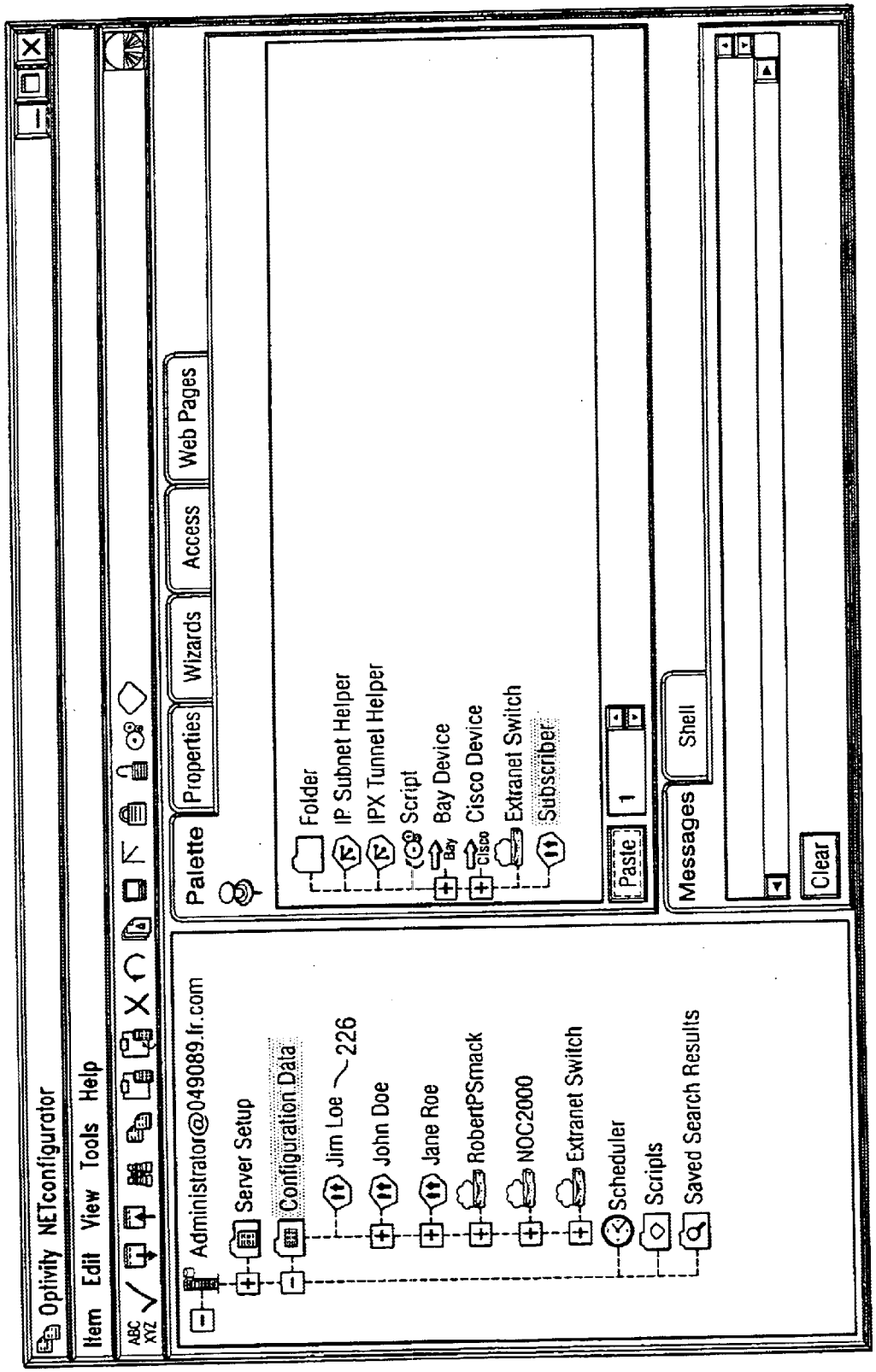
Figure 24:
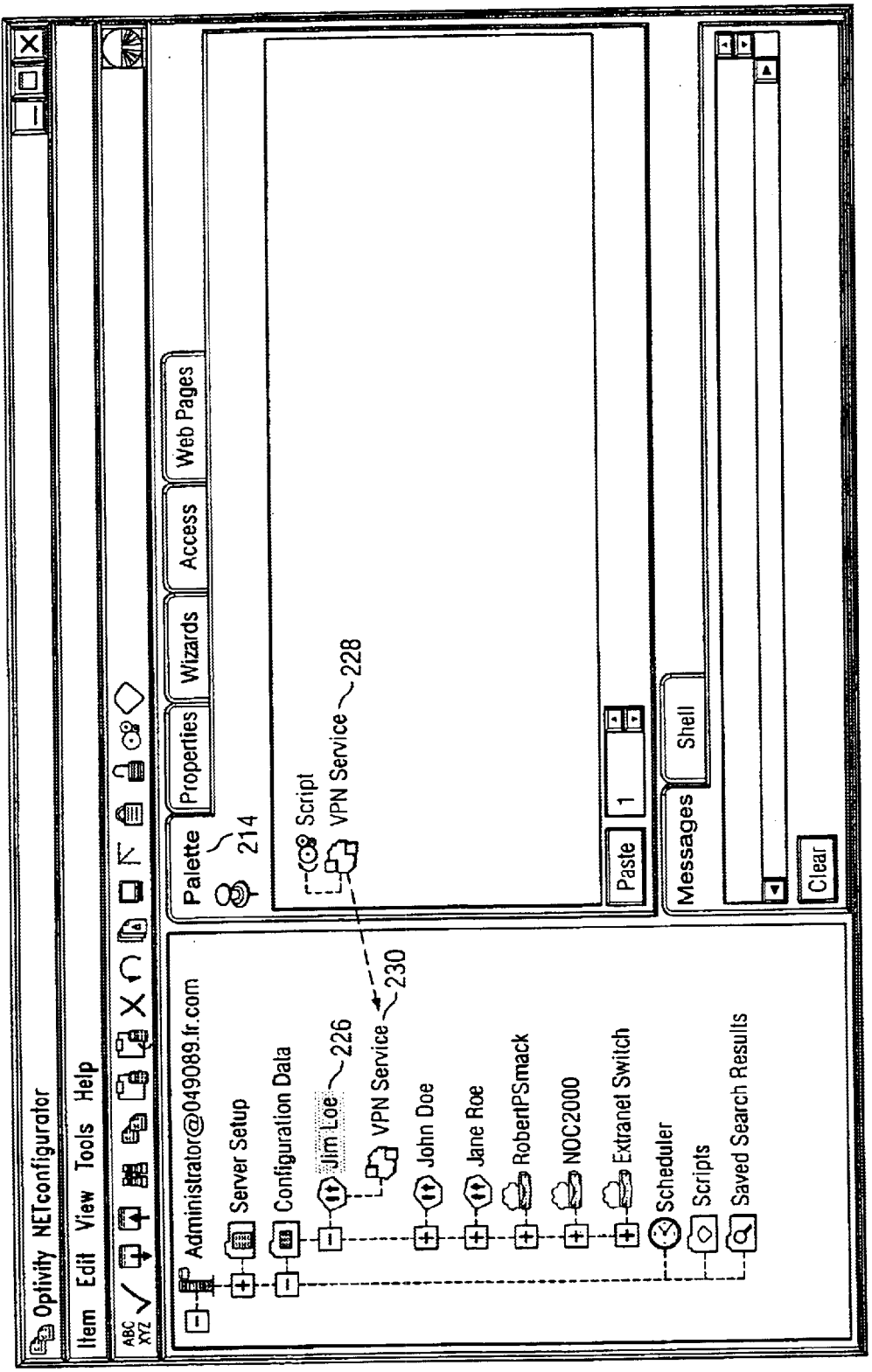

As shown in FIG. 22, after selecting the "Configuration Data" element 212, a palette tab presents different elements that can be added to the selected virtual private network element 212. A new subscriber 226 can be added by dragging-and-dropping the subscriber 224 palette tool onto the "Configuration Data" element 212. As shown in FIG. 23, the administrator can rename the new subscriber 226. As shown in FIG. 24, by selecting the new subscriber 226, selecting the "palette" tab 214, and dragging a "VPN Service" 228 (e.g., a tunnel) from the palette onto the new subscriber 226, the administrator can also configure a switch or switches to offer a particular tunneling protocol.

Figure 25:
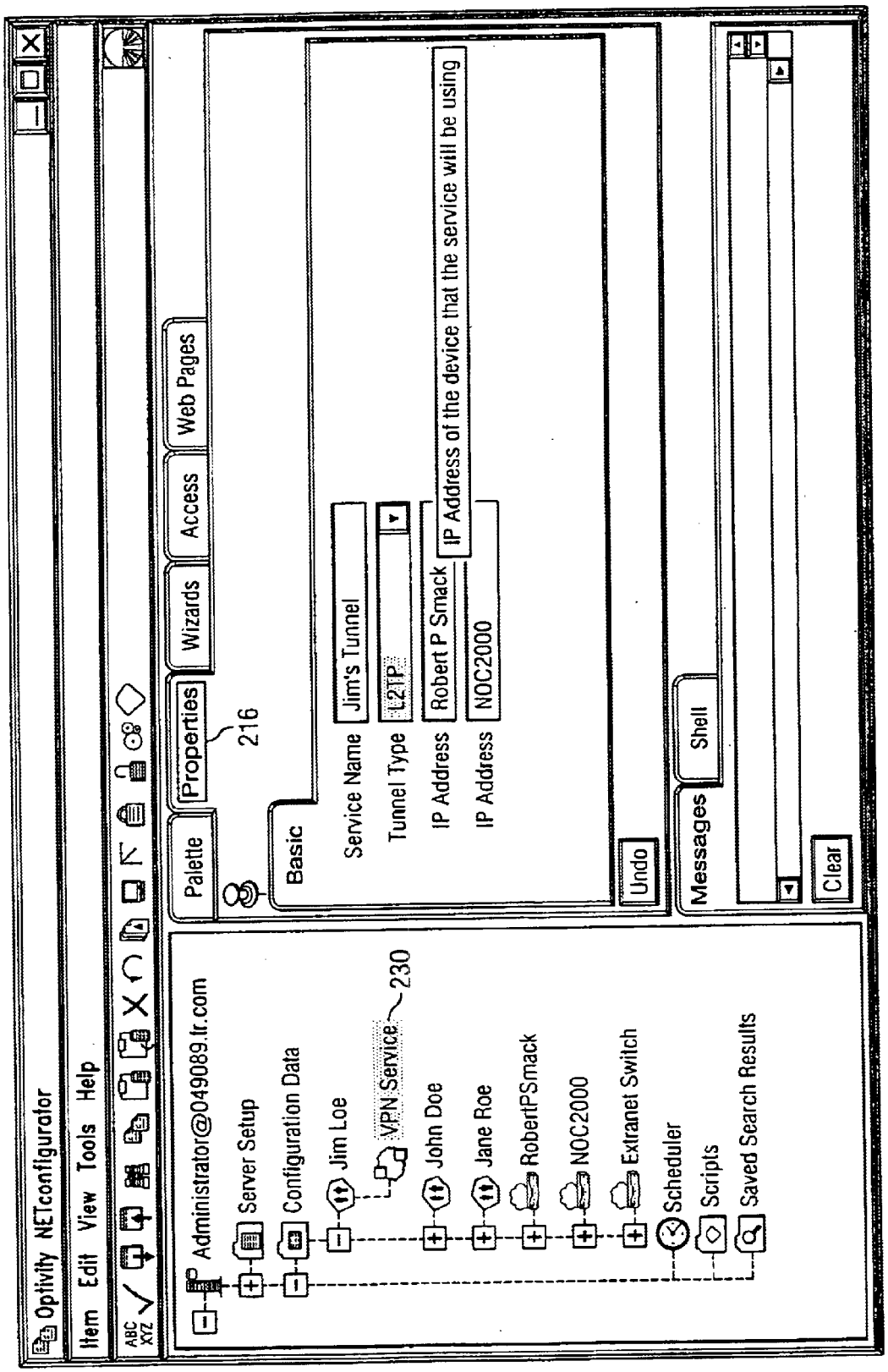

As shown in FIG. 25, the administrator can name the tunnel, define the tunneling technology used by the tunnel (e.g., L2TP), and enter the tunnel starting and ending points which, as shown, are extranet switches.

Figure 26:
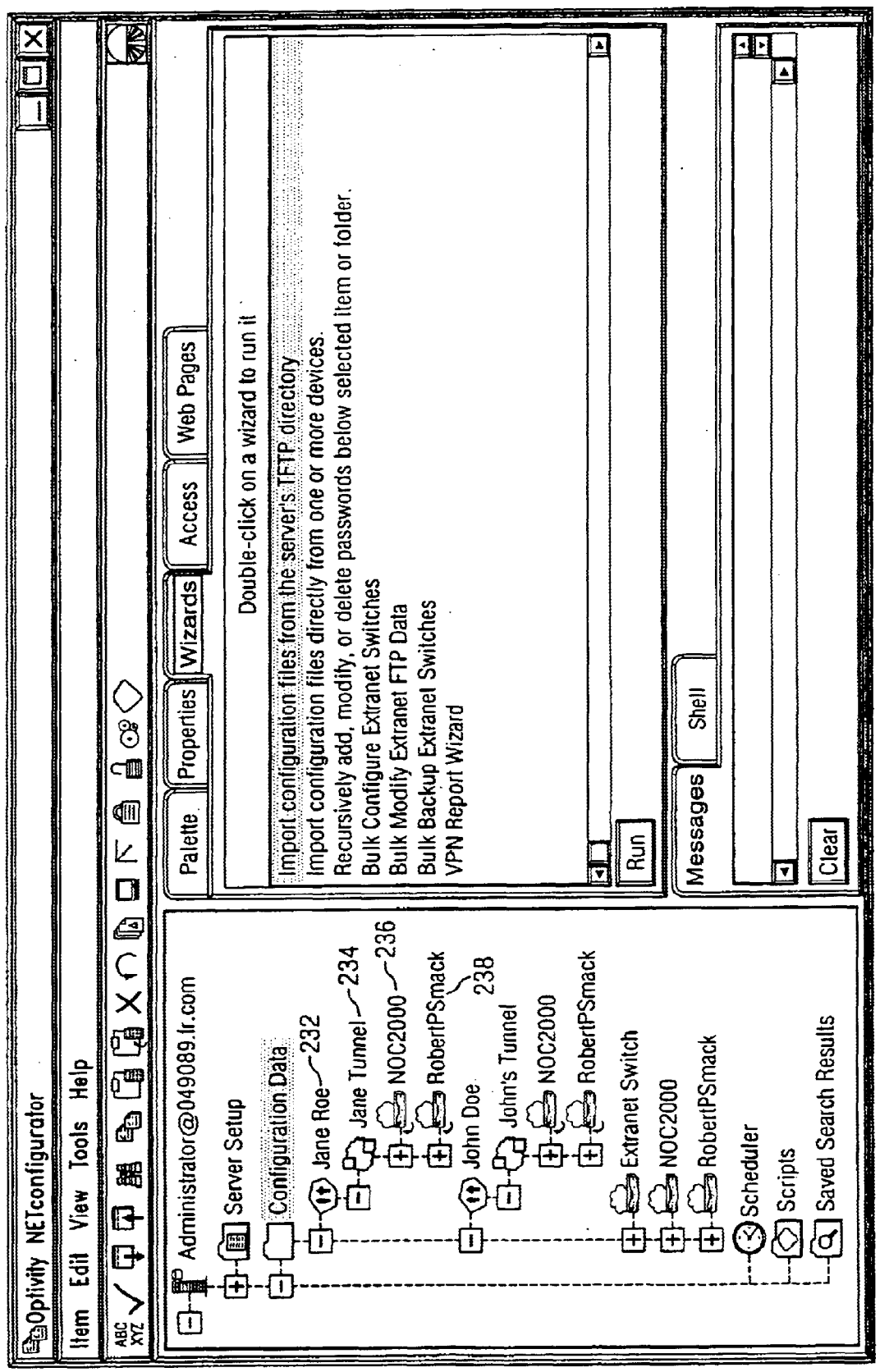
Figure 27:
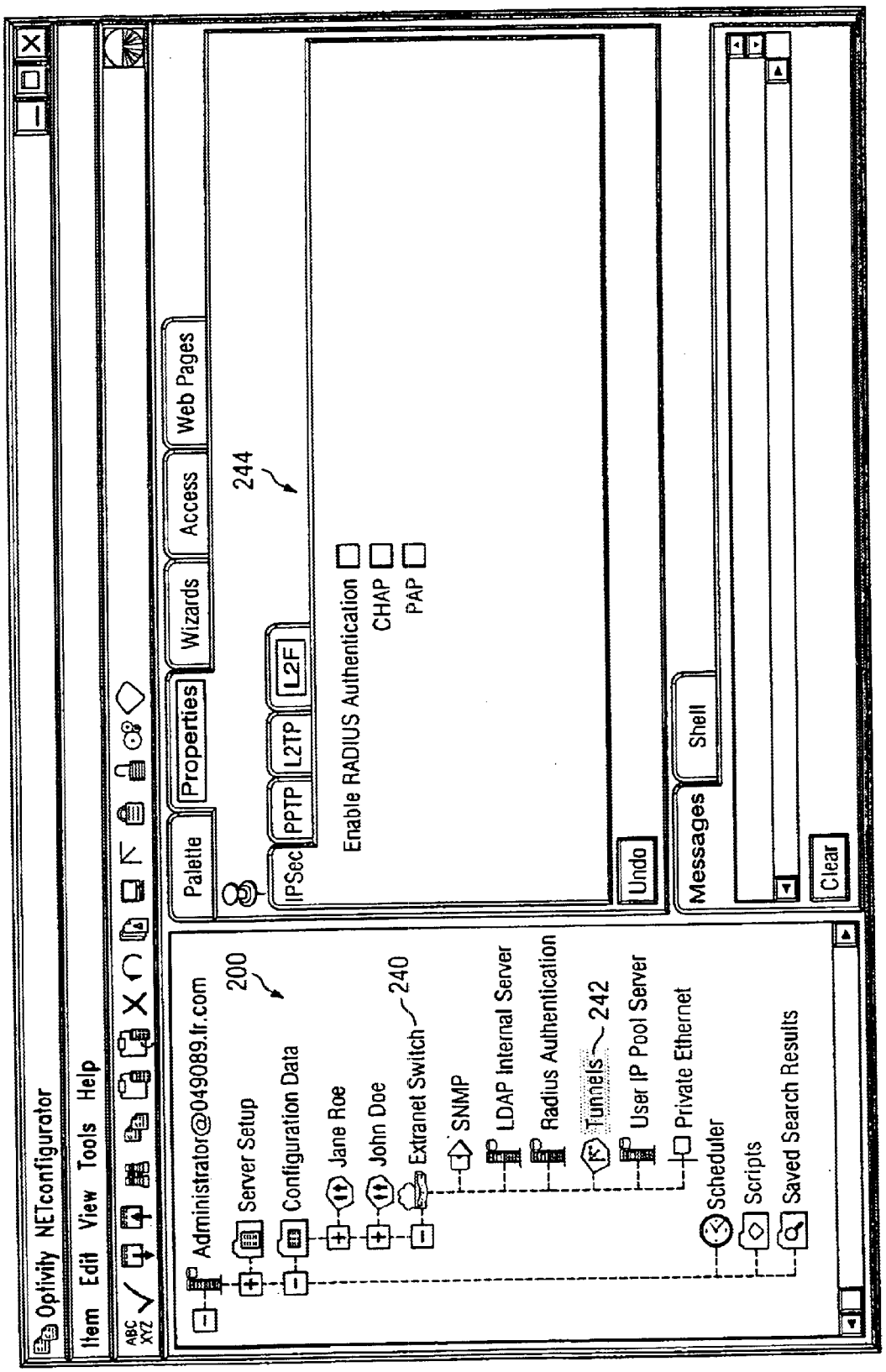

As shown in FIG. 26, after configuring different subscribers and switches, the GUI provides an administrator with a variety of different methods of looking at a virtual private network. For example, as shown, by expanding a subscriber 232 an administrator can quickly see shortcuts to the extranet switches 236, 238 offering tunnels for subscriber use. Alternatively, as shown in FIG. 27, the administrator can view the tunneling technologies offered by a particular switch 240 by using the navigation pane 200 to select the switch's tunnel element 242. The properties dialog 244 displays the configuration of the different tunneling technologies.

The different presentations of the data (e.g., subscriber based and switch based) described above enable the administrator to both ensure that subscribers are adequately served and that individual switches are configured as desired.

Figure 28:
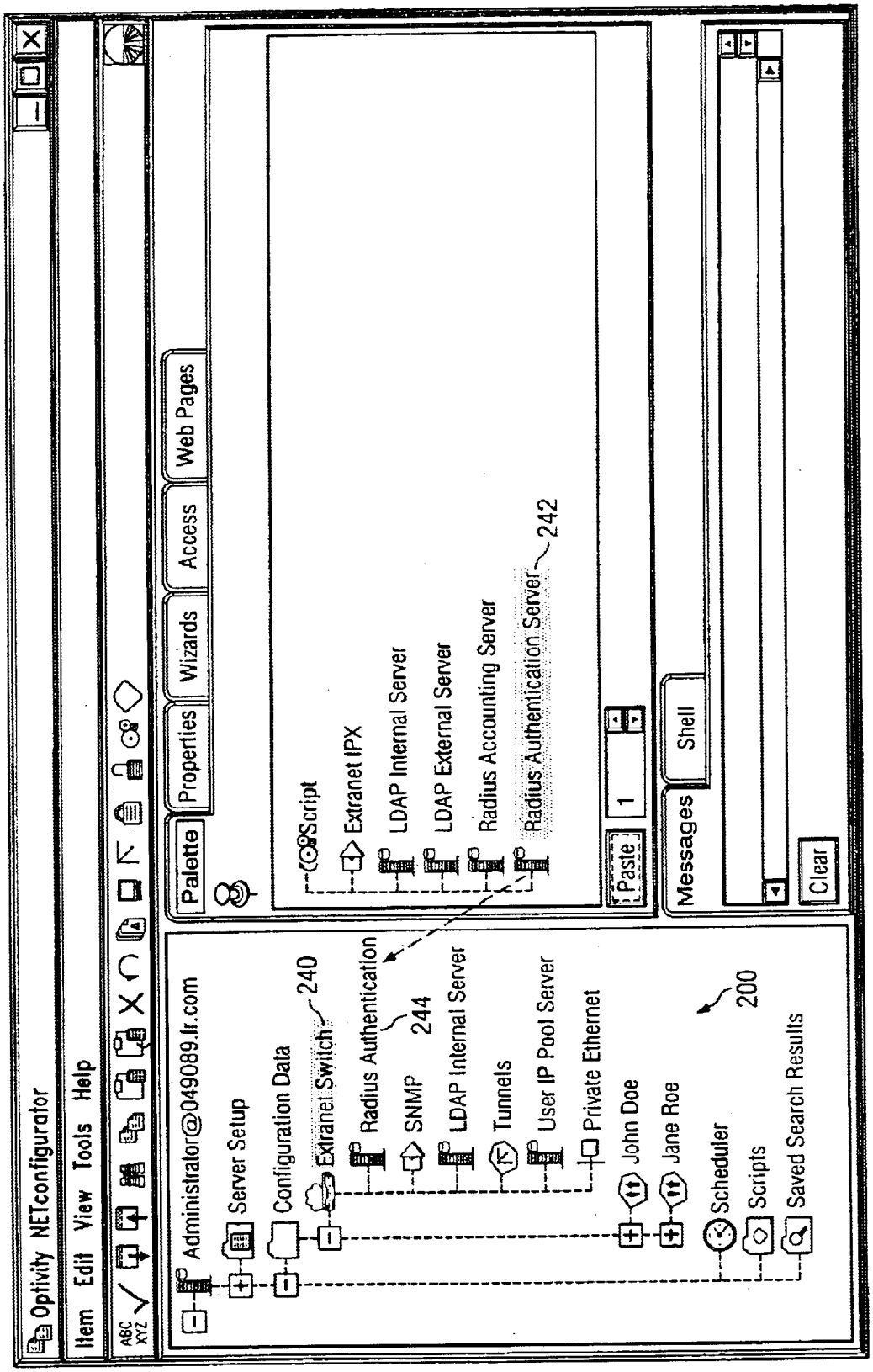
Figure 29:
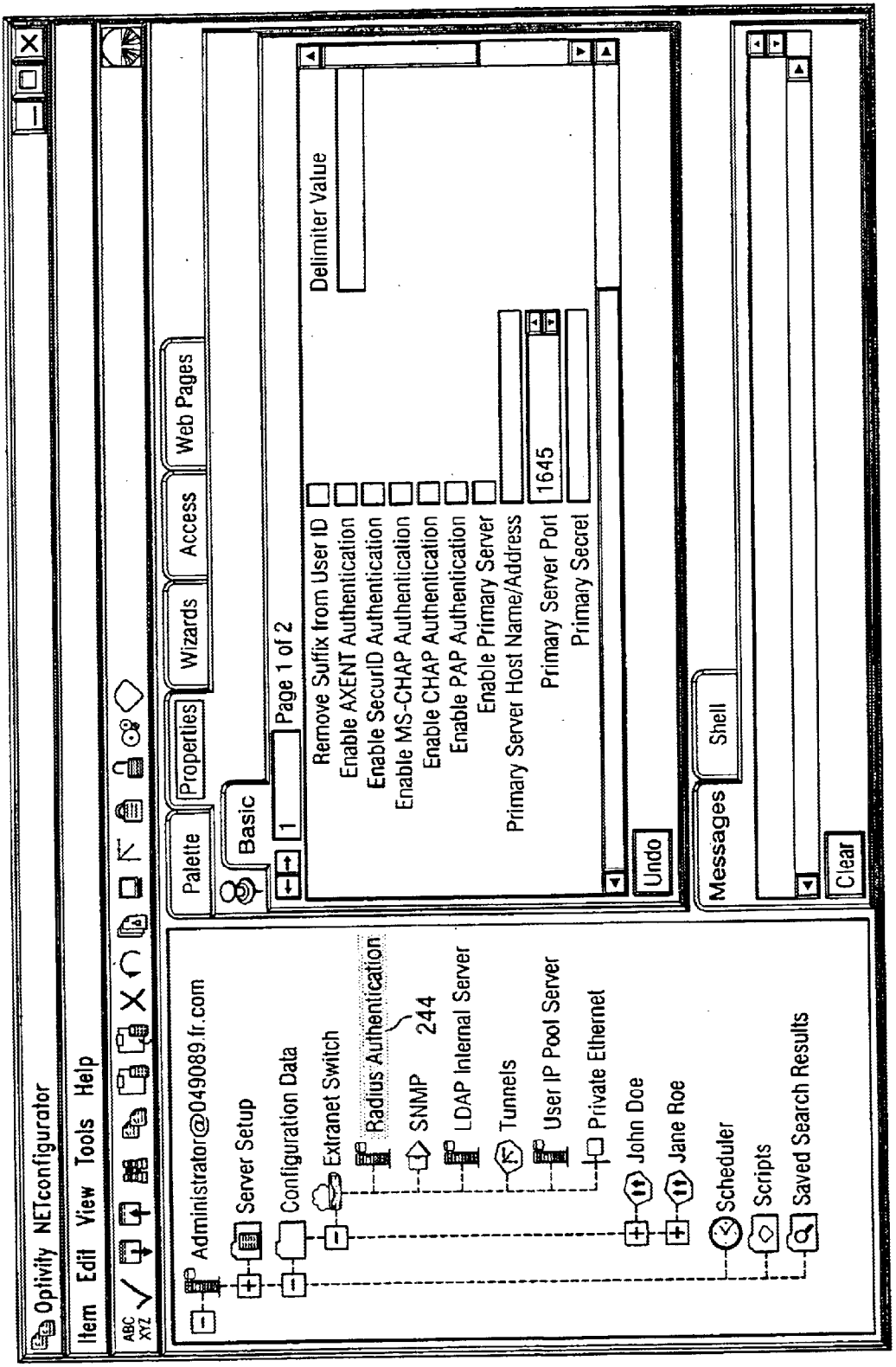

Referring to FIGS. 28–29, the process described above (i.e., selecting an element from the tree and using the tabbed dialog to view and modify the element's characteristics) can be used to configure a variety of virtual private network characteristics. For example, by selecting a switch 240 from the navigation pane 200, the administrator can view and modify the switch's 240 characteristics. As shown in FIG. 28, an administrator can add RADIUS Authentication 244 to a switch 240 by dragging-and-dropping the RADIUS Authentication Server palette selection 242 onto the selected switch 240. As shown in FIG. 29, the administrator can then set different RADIUS authentication settings for the switch 244. An administrator can use a similar technique to add and/or configure SNMP (Simple Network Management Protocol) settings, switch interfaces to private and/or public networks, Ethernet settings, IPX (Internetwork Packet Exchange) settings, and other extranet switch features displayed in the switch palette. Appendix C includes screenshots of the different palette elements and their properties that can be used to configure an extranet switch.

The alterations to the switches, for example, adding RADIUS authentication to a switch, while immediately represented to the administrator, is not exported until explicitly requested by the administrator. Again, this gives the administrator a chance to avoid unintended modifications.

Figure 30:
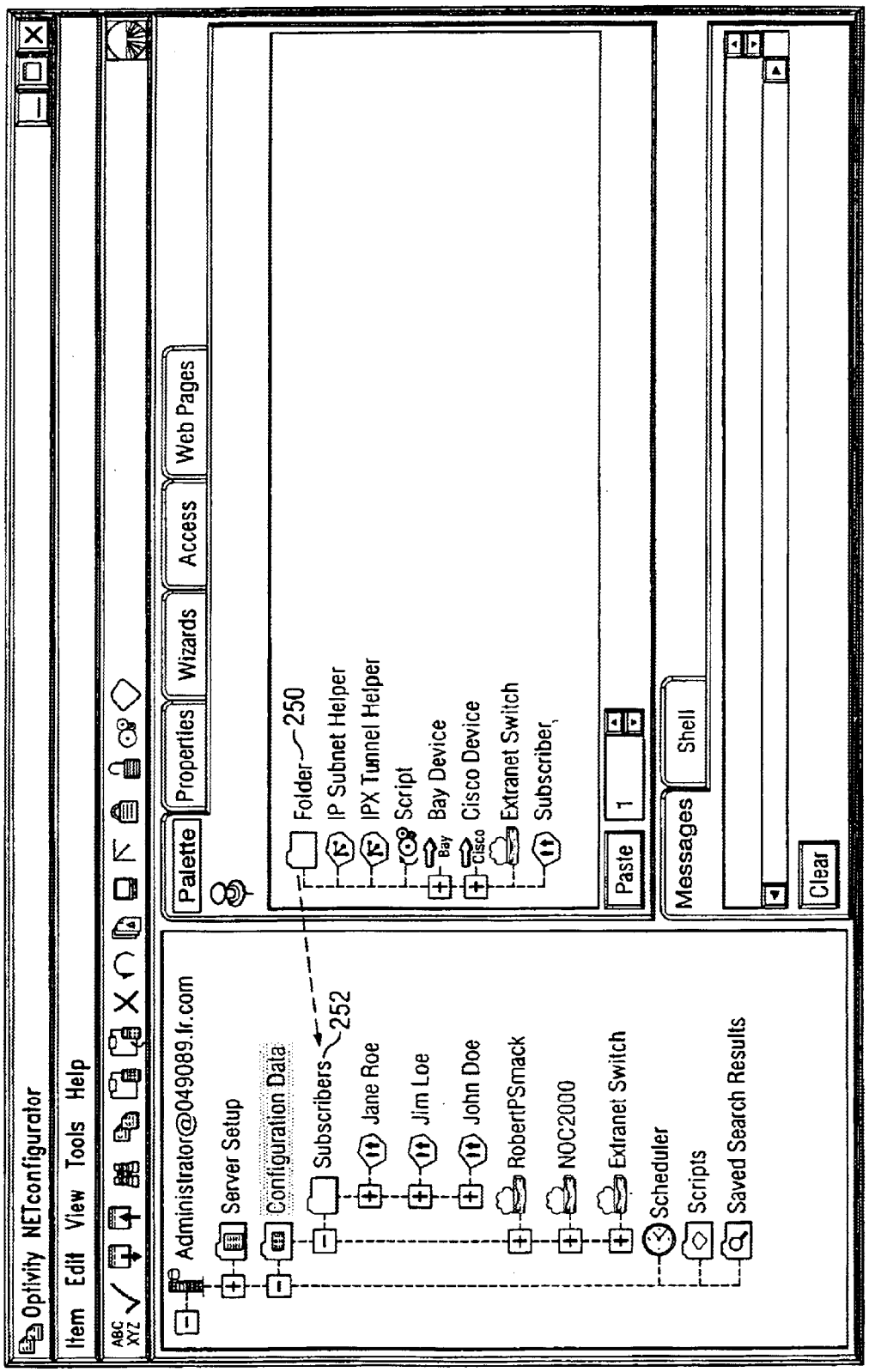
Figure 31:
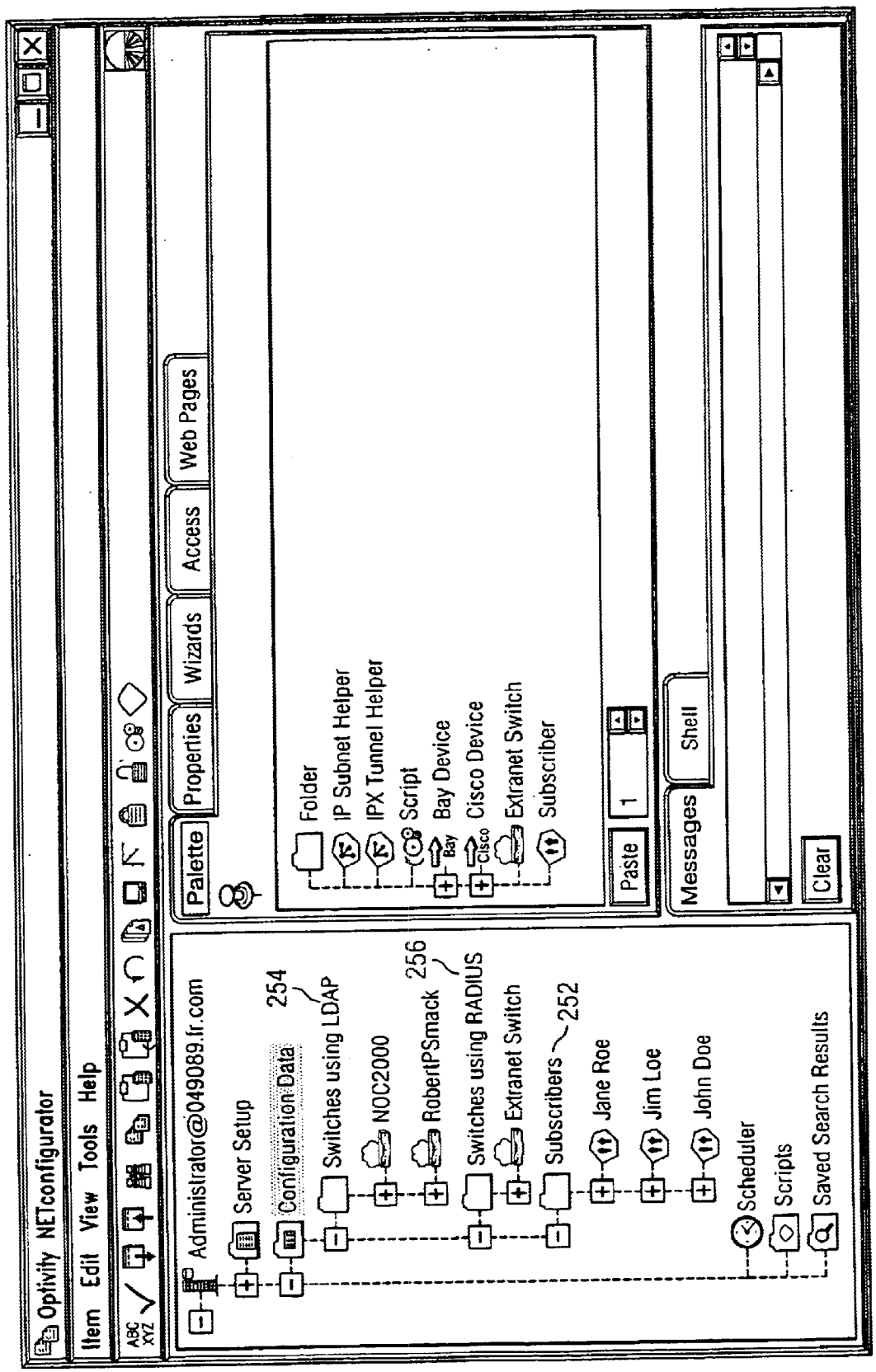

Referring to FIGS. 30–31, beyond viewing and modifying switch characteristics, an administrator can use the GUI to organize information for easy access and identification of different elements. For example, as shown in FIG. 30, an administrator can drag a folder 250 from the palette onto an element. The administrator can rename the dragged folder 252 (e.g., to "Subscribers") and drag-and-drop different subscribers into the folder 252. As shown in FIG. 31, a similar technique enables an administrator to organize different switches into different groupings such as switches using LDAP 254 for authentication and switches using RADIUS 256.

Integrated Access to a Switch's Configuration Mechanisms

As previously described, an extranet switch such as the Contivity™ switch can include a web-server and different network pages (e.g., HTML (HyperText Markup Language) documents) that enable an administrator to individually configure an extranet switch. By navigating to a switch web-server, an administrator can view and/or modify a switch's configuration.

Figure 32:
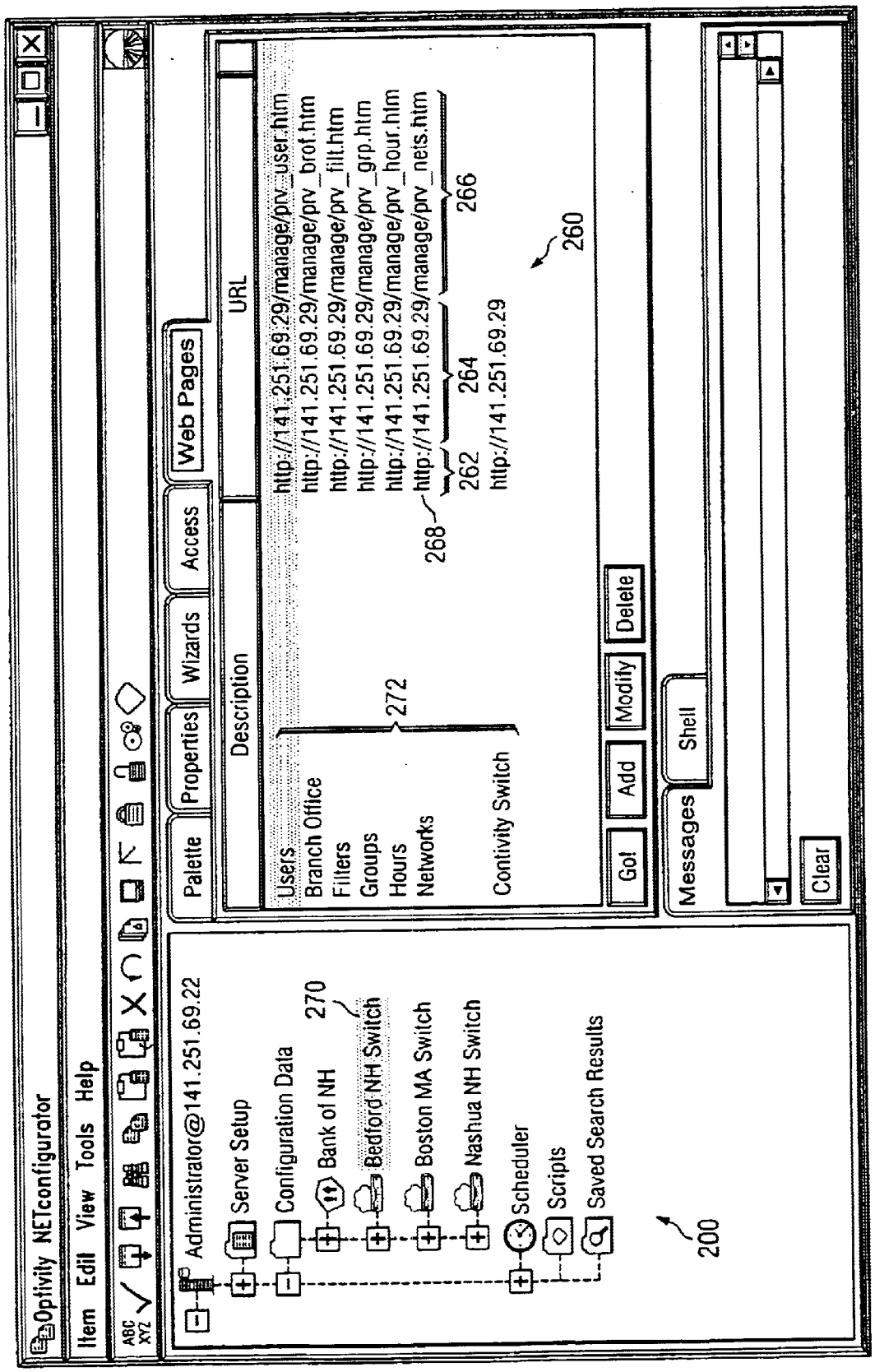
FIG. 32 is a screenshot of a menu of links to web-pages offered by an extranet switch.

Referring to FIG. 32, the GUI can present a menu 260 of network links (e.g., link 268) to web-pages offered by a selected extranet switch 270. As shown, the menu 260 includes a description of the link 272 and a corresponding URL (Universal Resource Locator) identifying a web-page offered by a switch. As shown, the URL includes designation of a communication protocol (e.g., HTTP (HyperText Transfer Protocol) 262, an IP address 264, and the location of a particular page at the specified IP address 268. When a user selects a link from the menu 260, the switch manager can transmit an HTTP request for the selected URL. Alternately, the switch manager can instantiate or call a network browser and pass the selected URL. The GUI prepares each URL in the menu 260 by prepending a switch's IP address 264 to a predefined set of web-page locations 266.

By providing the link menu in conjunction with the navigation pane 200, administrators can quickly access a desired page on any particular switch and can also quickly access the same page (e.g., the users page) on a variety of different switches, one after another. Additionally, the menu 260 obviates the need to remember the different extranet switch URLs or expend the time needed to navigate through any menu provided by the switch itself which necessitates potentially long waits for information to be transmitted to the switch manager.

Figure 33:
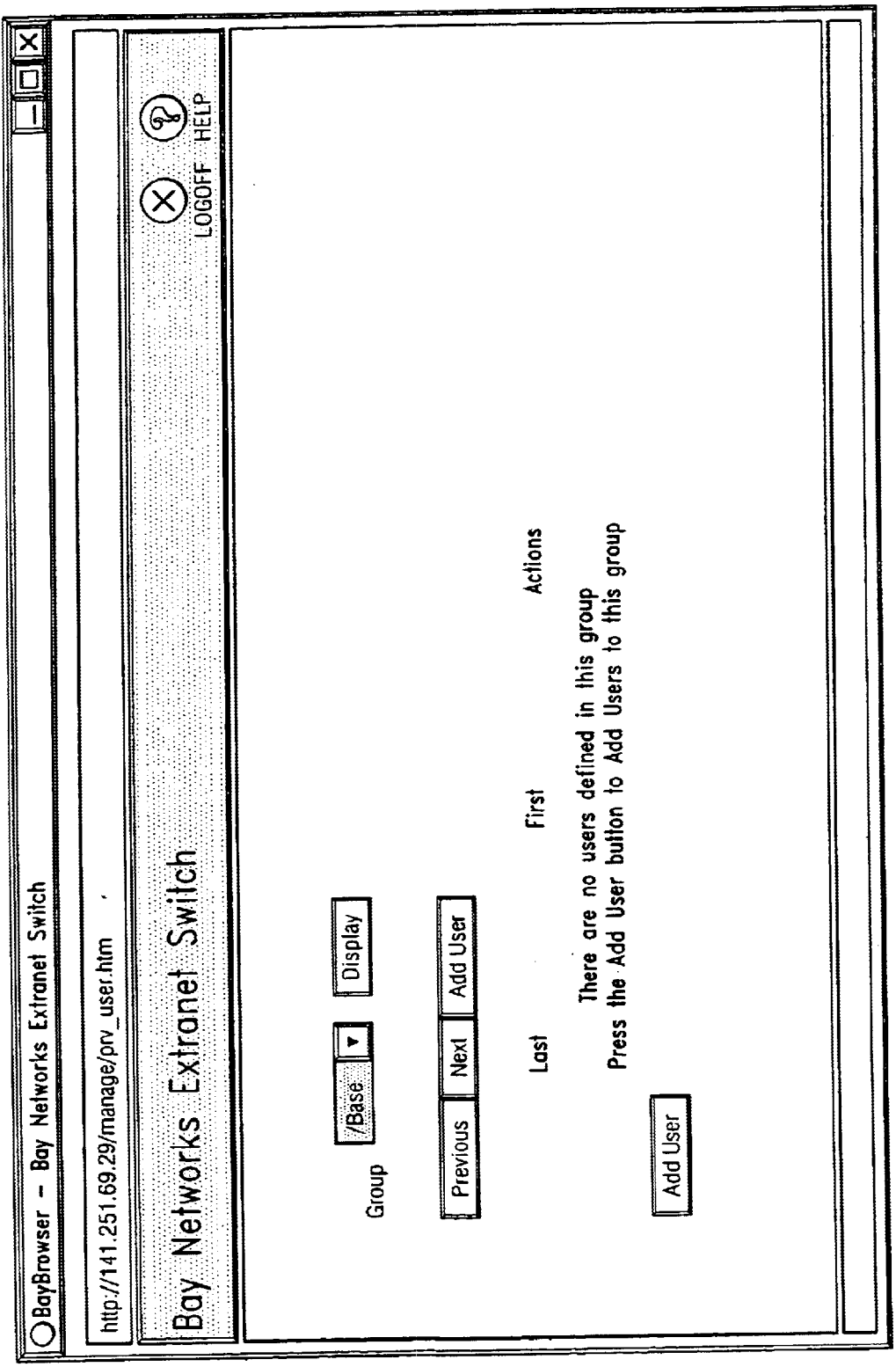
FIGS. 33–39 are screenshots of web-pages offered by an extranet switch.
Figure 34:
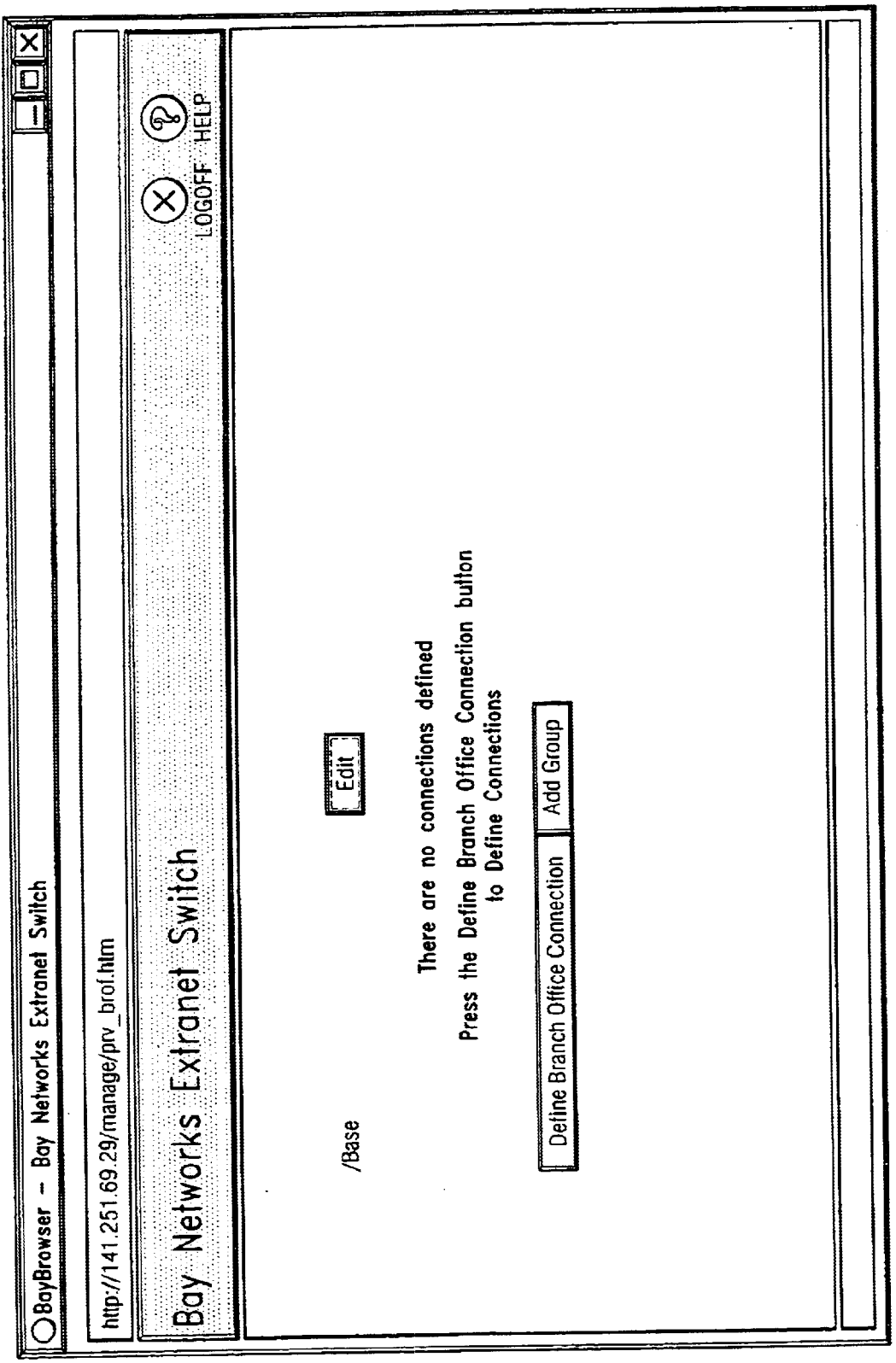
Figure 35:
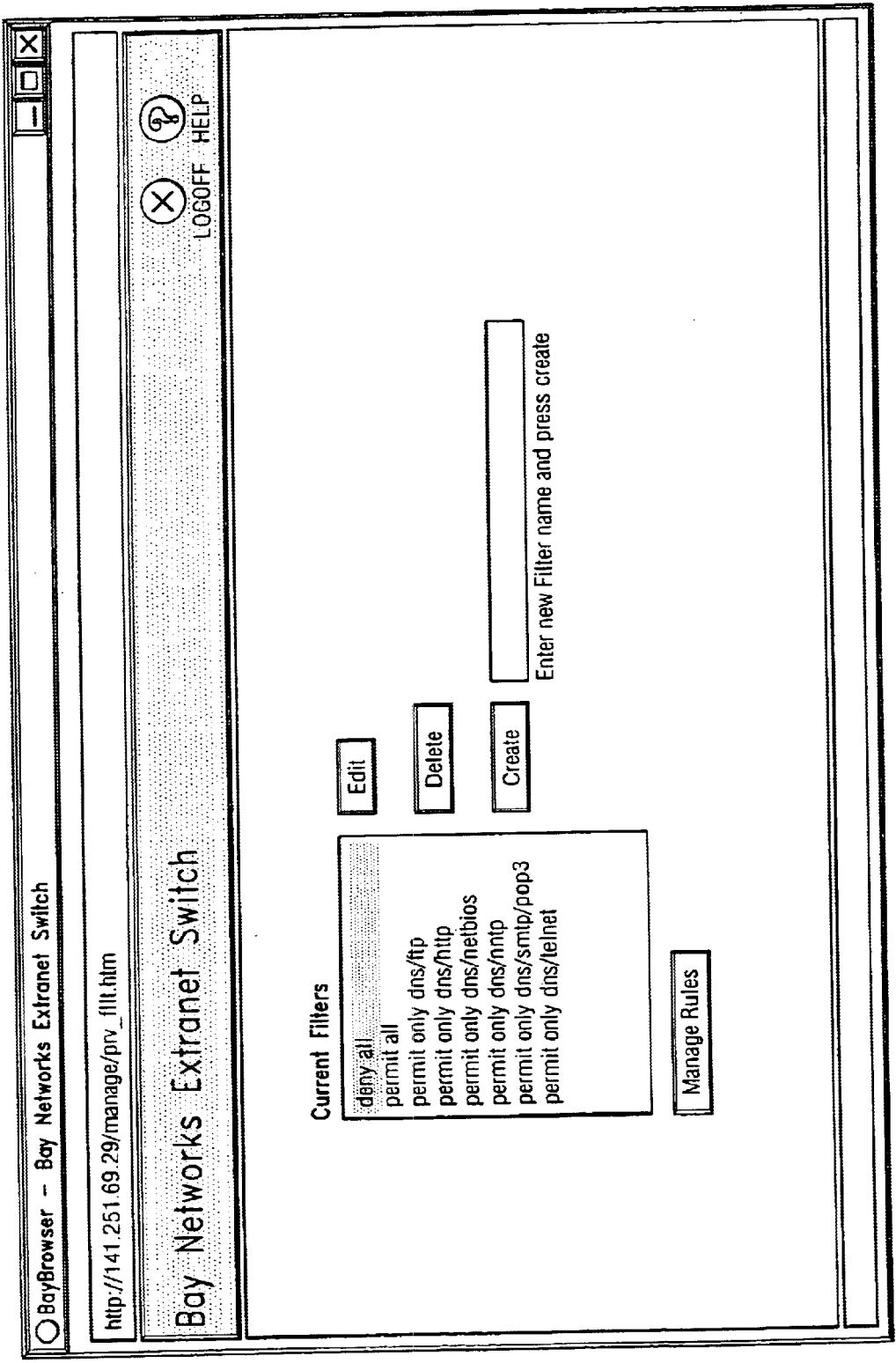
Figure 36:
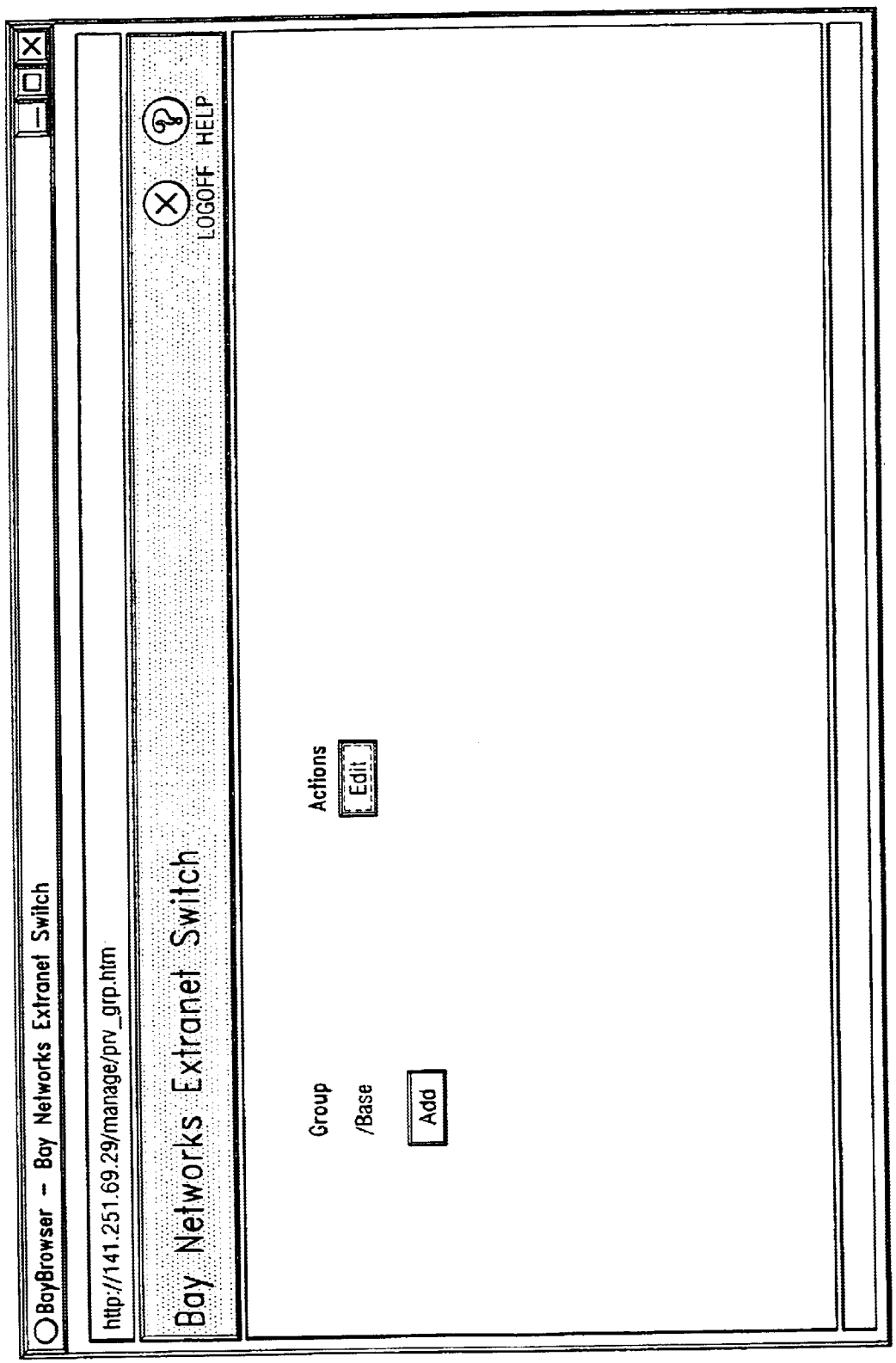
Figure 37:
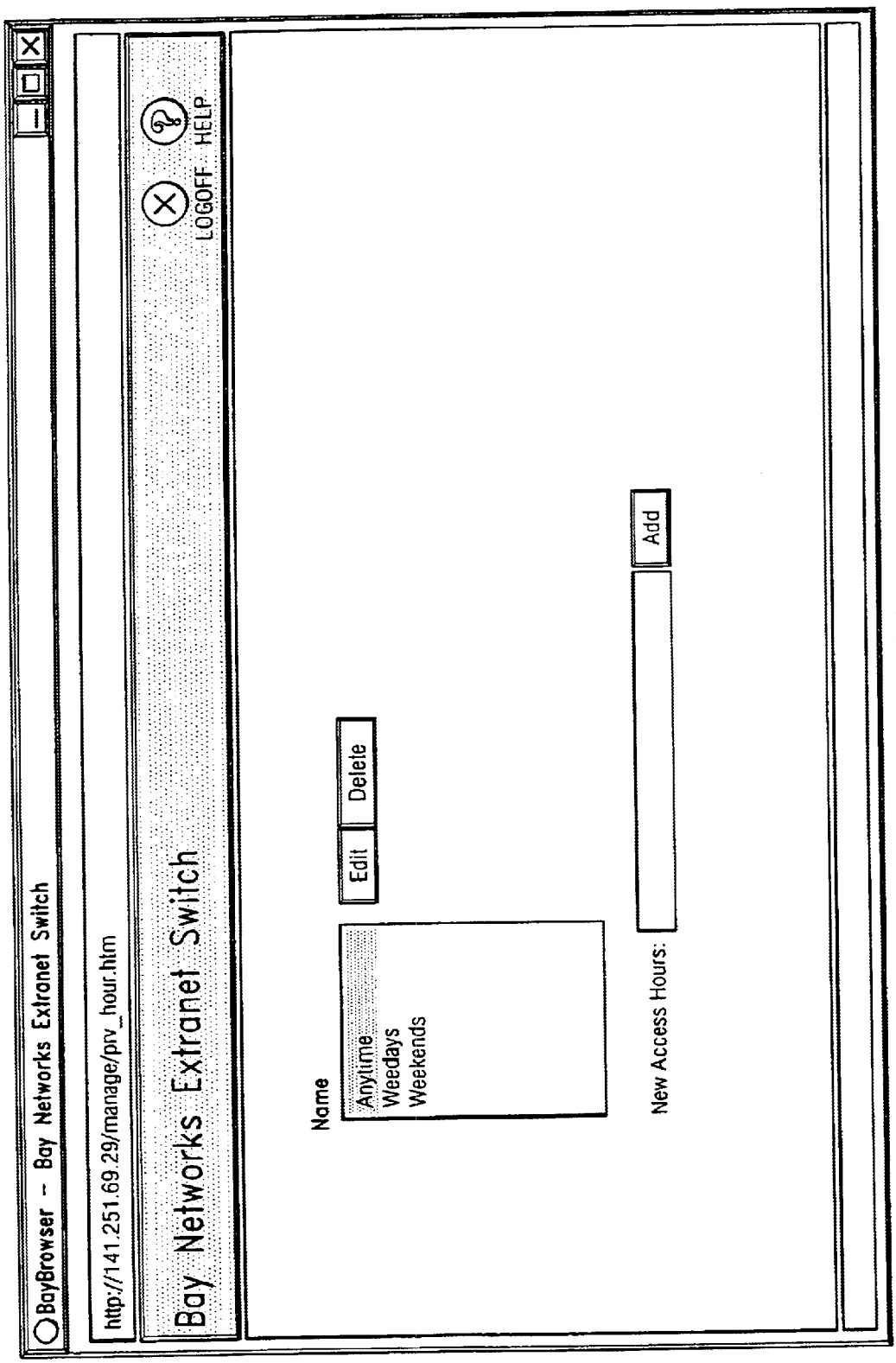
Figure 38:
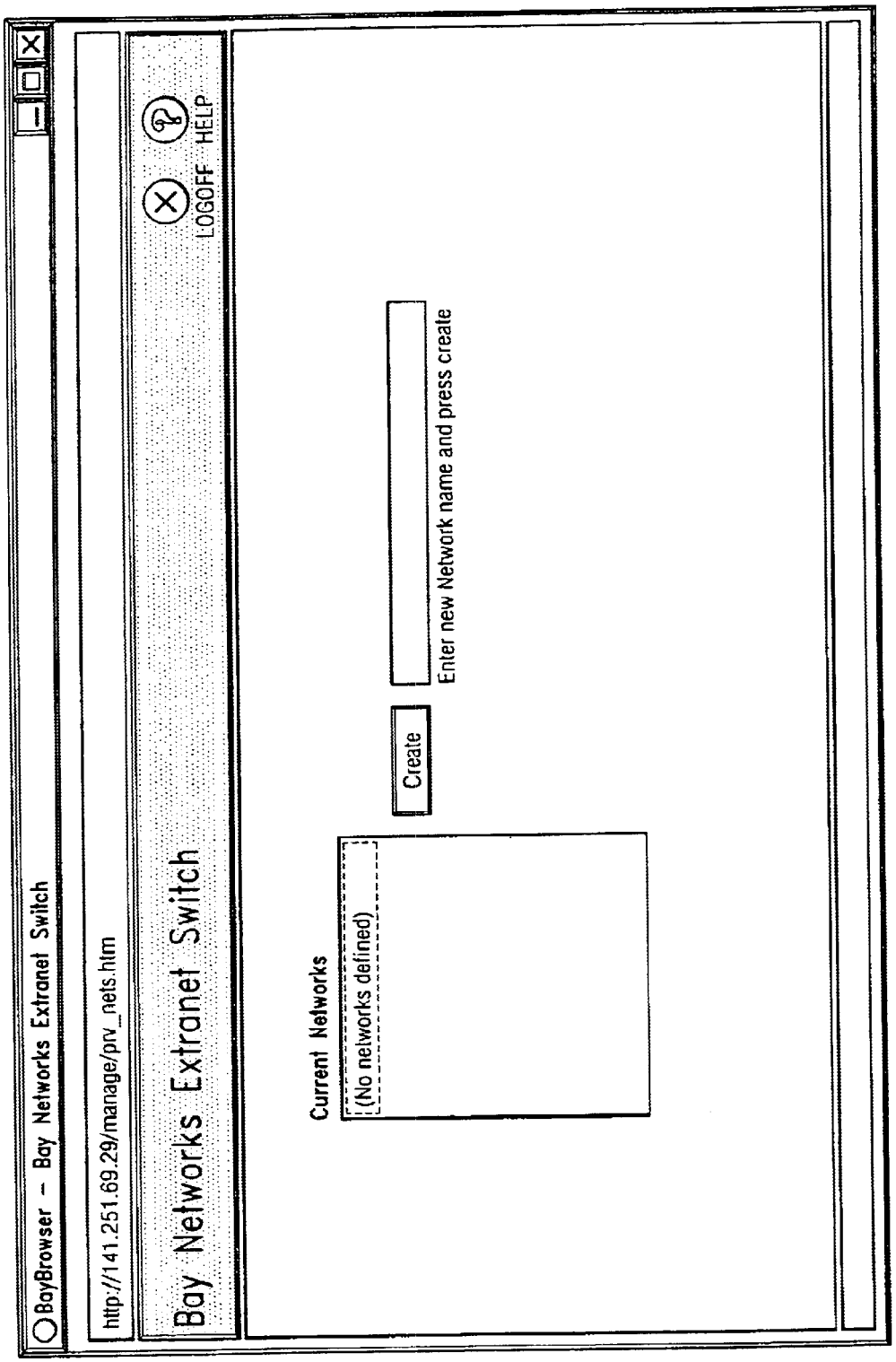
Figure 39:
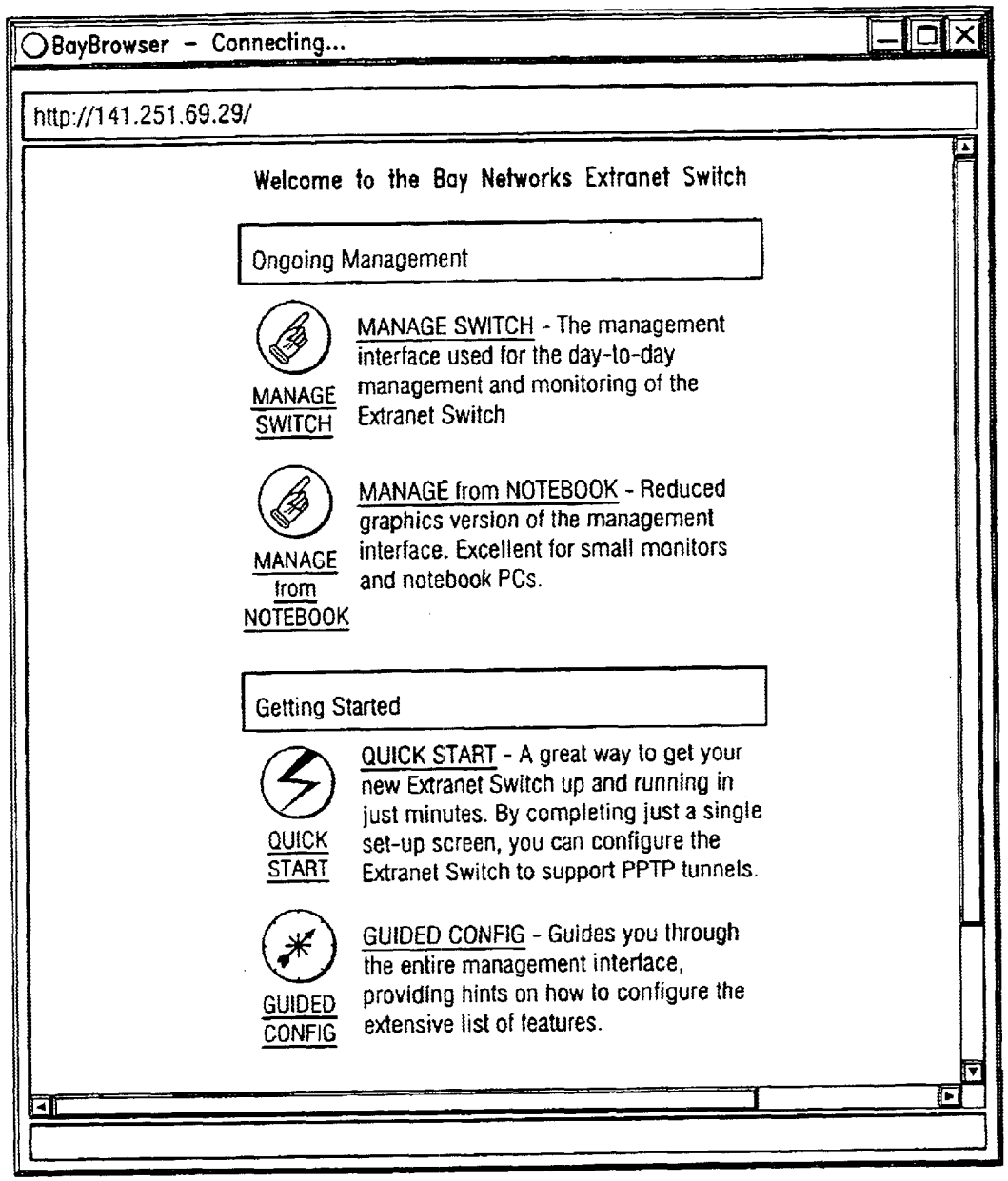

As shown, the web-pages include pages that control how a switch handles users (FIG. 33), branch offices (FIG. 34), packet filters (FIG. 35), groups of users (FIG. 36), access hours (FIG. 37), and other information such as a menu that tailors a web-based configuration session (FIG. 39). Descriptions of the functions of these different web-pages is described in the New Oak Communications Extranet Access Switch Administrators Guide, pages 82–138 of which are incorporated by reference herein.

Other Embodiments

The embodiments described above should not be considered limiting. For example, one of skill in the art could quickly construct a switch manager that perform the functions described above using different GUI controls or a different arrangement of GUI controls.

Additionally, the techniques described here are not limited to any particular hardware or software configuration; they may find applicability in any computing or processing environment. The techniques may be implemented in hardware or software, or a combination of the two. Preferably, the techniques are implemented in computer programs executing on programmable computers that each include a processor, a storage medium readable by the processor (including volatile and non-volatile memory and/or storage elements), at least one input device, and one or more output devices. Program code is applied to data entered using the input device to perform the functions described and to generate output information. The output information is applied to one or more output devices.

Each program is preferably implemented in a high level procedural or object oriented programming language to communicate with a computer system. however, the programs can be implemented in assembly or machine language, if desired. In any case, the language may be a compiled or interpreted language.

Each such computer program is preferable stored on a storage medium or device (e.g., CD-ROM, hard disk or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A method comprising:
    managing a virtual private network including an extranet switch by
    transmitting a script for requesting information describing at least one virtual private network attribute from multiple extranet switches providing at least one virtual private network function, the script including a script command;
    receiving the information;
    preparing a report by organizing the received information into a table that lists each of the multiple extranet switches and the corresponding virtual private network attribute received from each of the multiple extranet switches; and
    displaying the prepared report to a user.

2. The method of claim 1, further comprising transmitting a request for the information.

3. The method of claim 1, wherein the virtual private network function comprises providing at least one tunnel.

4. The method of claim 1, wherein the virtual private network function comprises authentication.

5. The method of claim 1, wherein the attribute comprises at least one tunneling characteristic.

6. The method of claim 5, wherein the tunneling characteristic comprises the tunnel capacity of the extranet switch.

7. The method of claim 5, wherein the tunneling characteristic comprises a number of users using a tunnel provided by the extranet switch.

8. The method of claim 5, wherein the tunneling characteristic comprises a tunneling protocol.

9. The method of claim 1, further comprising receiving a time interval, and wherein the preparing a reports comprises preparing a report based on the received time interval.

10. A method comprising:

managing a virtual private network including an extranet switch by transmitting a request for tunneling data to multiple extranet switches providing virtual private network tunnels using a script having a script command;

receiving the requested tunneling data from the multiple extranet switches in response to the request;

preparing a report based on the received information, the report being organized into a table that lists the different extranet switches and their corresponding tunneling data; and displaying the prepared report to a user.

11. A method comprising:

managing a virtual private network including an extranet switch by transmitting a script for requesting information on multiple extranet switches providing virtual private network tunnels, the information including a number of tunnels provided by each extranet switch and a number of users configured to use the tunnels, the script includes a script command;

receiving the information; and displaying the received information to a user.

12. A method of managing a virtual private network including at least one extranet switch, comprising:

transmitting a script for requesting information describing at least one virtual private network attribute from a selected one of at least one extranet switch providing at least one virtual private network function, the script including a script command;

receiving the information;

providing a menu identifying at least one report capable of preparation;

receiving a selection identifying at least one report;

preparing the selected report including the received information of the selected extranet switch; and displaying the prepared report to a user.

13. A computer program product, disposed on a computer readable medium, for managing a virtual private network using an extranet switch, the computer program including instructions for causing a processor to:

manage a virtual private network including an extranet switch, including instructions to:

transmit a script for requesting information describing at least one virtual private network attribute from multiple extranet switches providing at least one virtual private network function, the script including a script command;

receive the information;

prepare a report by organizing the received information into a table that include the at least one virtual private network attribute received from each of the multiple extranet switches; and display the prepared report to a user.

14. The computer program product of claim 13, further comprising instructions for causing the processor to transmit a request for the information.

15. The computer program product of claim 13, wherein the virtual private network function comprises providing at least one tunnel.

16. The computer program product of claim 13, wherein the virtual private network function comprises authentication.

17. The computer program product of claim 13, wherein the attribute comprises at least one tunneling characteristic.

18. The computer program product of claim 17, wherein the tunneling characteristic comprises the tunnel capacity of the extranet switch.

19. The computer program product of claim 17, wherein the tunneling characteristic comprises a number of users using a tunnel provided by the extranet switch.

20. The computer program product of claim 17, wherein the tunneling characteristic comprises tunneling protocol.

* * * * *